US 11,341,553 B1

(12) United States Patent
Borunda et al.

(10) Patent No.: US 11,341,553 B1
(45) Date of Patent: May 24, 2022

(54) METHOD AND SYSTEMS FOR A PRODUCT LIST SERVER

(71) Applicant: United Services Automobile Association (USAA), San Antonio, TX (US)

(72) Inventors: Adrian Borunda, San Antonio, TX (US); Jack Conrad, San Antonio, TX (US); Ferdinand Glenn Lyday, Helotes, TX (US); Jason H. Kilgrow, San Antonio, TX (US); Marty Lee Mendivil, San Antonio, TX (US); Seth A. Roberts, San Antonio, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 940 days.

(21) Appl. No.: 15/167,170

(22) Filed: May 27, 2016

Related U.S. Application Data

(60) Provisional application No. 62/168,518, filed on May 29, 2015.

(51) Int. Cl.
*G06Q 30/00* (2012.01)
*G06Q 30/06* (2012.01)

(52) U.S. Cl.
CPC ..... *G06Q 30/0613* (2013.01); *G06Q 30/0633* (2013.01); *G06Q 30/0641* (2013.01)

(58) Field of Classification Search
CPC ........... G06Q 30/0633; G06Q 30/0641; G06Q 30/0601–0645; G06Q 30/08
USPC ................................................ 705/26.1–27.2
See application file for complete search history.

(56) References Cited

U.S. PATENT DOCUMENTS

| | | | |
|---|---|---|---|
| 4,026,050 A | 5/1977 | Boles |
| D256,475 S | 8/1980 | McDanles |
| 5,154,330 A | 10/1992 | Haynes |
| D331,076 S | 11/1992 | Montgomery |
| 5,350,197 A | 9/1994 | Schmidt |
| D366,903 S | 2/1996 | Baggott |
| 6,029,380 A | 2/2000 | Goddard |
| 6,249,773 B1 | 6/2001 | Allard et al. |
| 6,644,697 B1 | 11/2003 | Schinella |
| 7,136,829 B2 | 11/2006 | Hellal et al. |

(Continued)

OTHER PUBLICATIONS

Chi-Yi Lin and Ming Tze Hung, "A location-based personal task reminder for mobile users" (2013), Springer Verlag London. (Year: 2013).*

(Continued)

*Primary Examiner* — Jeffrey A. Smith
*Assistant Examiner* — Kennedy Gibson-Wynn
(74) *Attorney, Agent, or Firm* — Crowell & Moring LLC

(57) ABSTRACT

An apparatus and a method related to generating or using a shopping list are disclosed. Shopping lists aid a consumer in purchasing items. The apparatus and method may be used to trigger when to generate a shopping list, what items to include on the shopping list, cost associated with purchasing one or more items on the shopping list, sharing of or collaborating on the generation or purchase of items on the shopping list, using location-based tools (such as geo-fencing) when using a shopping list, evaluating different payment methods when purchasing items, and routing to/within stores when purchasing items from a shopping list.

23 Claims, 14 Drawing Sheets

(56) References Cited

U.S. PATENT DOCUMENTS

| | | | |
|---|---|---|---|
| 7,213,743 | B2 | 5/2007 | Carlson et al. |
| 7,219,822 | B2 | 5/2007 | Chretien et al. |
| D547,023 | S | 7/2007 | Buerchner et al. |
| 7,461,783 | B2 | 12/2008 | Rostosky |
| 7,689,473 | B2 | 3/2010 | Borom et al. |
| 7,726,563 | B2 | 6/2010 | Scott et al. |
| 7,814,690 | B2 | 10/2010 | Tritt et al. |
| 8,219,450 | B2 | 7/2012 | Hellal et al. |
| 8,239,276 | B2 | 8/2012 | Lin et al. |
| 8,392,287 | B2 | 3/2013 | Tsai |
| 8,504,440 | B1 | 8/2013 | Kolawa et al. |
| 8,600,835 | B1* | 12/2013 | Lueck ................ G06Q 30/0283 705/26.1 |
| 8,645,223 | B2 | 2/2014 | Ouimet |
| 8,676,657 | B2* | 3/2014 | Fenton .................... H04L 67/02 705/26.1 |
| 8,757,666 | B1 | 6/2014 | Santore |
| 8,812,376 | B2 | 8/2014 | Goulart |
| 8,972,279 | B2 | 3/2015 | Cole et al. |
| 9,098,871 | B2 | 8/2015 | Argue et al. |
| 9,135,652 | B2 | 9/2015 | Argue et al. |
| 9,147,208 | B1 | 9/2015 | Argue et al. |
| 9,230,379 | B2 | 1/2016 | Ricci |
| 9,235,860 | B1* | 1/2016 | Boucher ............ G06Q 30/0641 |
| 9,449,340 | B2 | 9/2016 | Argue et al. |
| 2012/0130796 | A1* | 5/2012 | Busch ................ G06Q 30/0267 705/14.36 |
| 2015/0317708 | A1* | 11/2015 | Eramian ............ G06Q 30/0633 705/26.8 |

OTHER PUBLICATIONS

Mozeik, Celeste K. "Customer Adoption of Online Restaurant Services: A Multi-Channel Approach." Order No. 1444649 University of Delaware, 2007. Ann Arbor: ProQuest. Web. Jan. 10, 2022. (Year: 2007).*

* cited by examiner

METHOD AND SYSTEMS FOR A PRODUCT LIST SERVER

REFERENCE TO RELATED APPLICATION

This application claims priority to U.S. Provisional Application No. 62/168,518, filed on May 29, 2015, the entirety of which is hereby incorporated by reference herein.

TECHNICAL FIELD

The present description relates to a list of products for a consumer to purchase. More specifically, a server is configured to analyze a consumer's profile in order to generate the product list.

BACKGROUND

People, by their very nature, compile lists. One type of list is a shopping list. The shopping list may aid a consumer in purchasing various goods. However, compiling lists may be a tiresome task.

SUMMARY

In a first aspect, a method for generating a shopping list for a consumer is disclosed. The method includes: accessing a consumer profile for the consumer; determining a life event based on at least a part of the consumer profile, the life event comprising an event that changes a respective consumer's status or circumstances; accessing a data structure correlating the determined life event with purchases associated with the life event, the purchases correlated to the determined life event being determined based on purchases from similarly situated consumers; generating a shopping list based on the accessed data structure; and sending at least a part of the shopping list to the consumer.

In a second aspect, a method for determining whether to include an item in a shopping list is disclosed. The method includes: accessing a consumer profile for a consumer; determining an item for purchase by the consumer; accessing from the consumer profile a purchase window associated with purchasing the item; determining whether the consumer is scheduled to purchase the item; accessing a database of consumer promotions; determining whether the item is included in the database of consumer promotions; and in response to determining that the item is included in the database and in response to determining that the consumer is scheduled to purchase the item, including the item in a shopping list associated with the consumer.

In a third aspect, a method for determining money cost and time cost for purchasing a list of items is disclosed. The method includes: accessing a consumer profile for a consumer; accessing, based on the consumer profile, a list of items for purchase; selecting a first store and a second store from which to purchase the items; accessing a database of consumer promotions; determining a money cost and a time cost for purchasing the list of items from each of the first store and the second store; and presenting to the consumer the money cost and the time cost for purchasing the list of items from each of the first store and the second store.

In a fourth aspect, a method for collaborating in purchasing a list of items is disclosed. The method includes: accessing a profile associated with a group of consumers; accessing, based on the profile, a list of items for purchase; assigning items within the list of items to respective consumers within the group of consumers; sending a communication to the group of consumers, the communication comprising the list of items for purchase and indicative of the items assigned to the respective consumers; monitoring purchases from the different consumers; and in response to receiving an indication of a purchase of an item, sending a communication to the group of consumers indicative of the purchase of the item.

In a fifth aspect, a method for determining whether to send a communication to a consumer regarding an item for purchase is disclosed. The method includes: accessing a consumer profile for the consumer; accessing, based on the consumer profile, the item for purchase; determining a store from which to purchase the item; monitoring a location of the consumer; determining, based on the location of the consumer, a store location of the store, the store location selection from a plurality of locations of the store; determining a distance between the location of the consumer and the store location; determining whether the distance is less than a predetermined distance; and in response to determining that the distance is less than the predetermined distance, sending the communication to the consumer, the communication indicating that the item is available for purchase at the store location of the store and indicating the distance to the store location.

In a sixth aspect, a method for determining costs associated with multiple payment methods is disclosed. The method includes: receiving an indication that a consumer is scheduled to pay for one or more items; accessing a consumer profile for the consumer; accessing, based on the consumer profile, a first payment method and a second payment method; determining a first cost to pay for the one or more items using the first payment method; determining a second cost to pay for the one or more items using the first payment method; and presenting the first cost and the second cost to the consumer.

In a seventh aspect, a method for routing a consumer to and within a store is disclosed. The method includes: accessing a consumer profile for a consumer; accessing, based on the consumer profile, an item for purchase; determining a store from which to purchase the item; providing to the consumer driving directions to the store; monitoring the consumer at least partly while the consumer is driving to the store; providing to the consumer directions to the item within the store; and monitoring the consumer at least partly while the consumer is within the store.

In an eighth aspect, an apparatus for generating a shopping list for a consumer is disclosed. The apparatus includes: memory configured to store processor-executable instructions; and a processor in communication with the memory and configured to execute the processor-executable instructions to: access a consumer profile for the consumer; determine a life event based on at least a part of the consumer profile, the life event comprising an event that changes a respective consumer's status or circumstances; access a data structure correlating the determined life event with purchases associated with the life event, the purchases correlated to the determined life event being determined based on purchases from similarly situated consumers; generate a shopping list based on the accessed data structure; and send at least a part of the shopping list to the consumer.

Other systems, methods, and features will be, or will become, apparent to one with skill in the art upon examination of the following figures and detailed description. It is intended that all such additional systems, methods, features and be included within this description, be within the scope of the disclosure, and be protected by the following claims.

BRIEF DESCRIPTION OF THE DRAWINGS

The product list system may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

Figure 1:
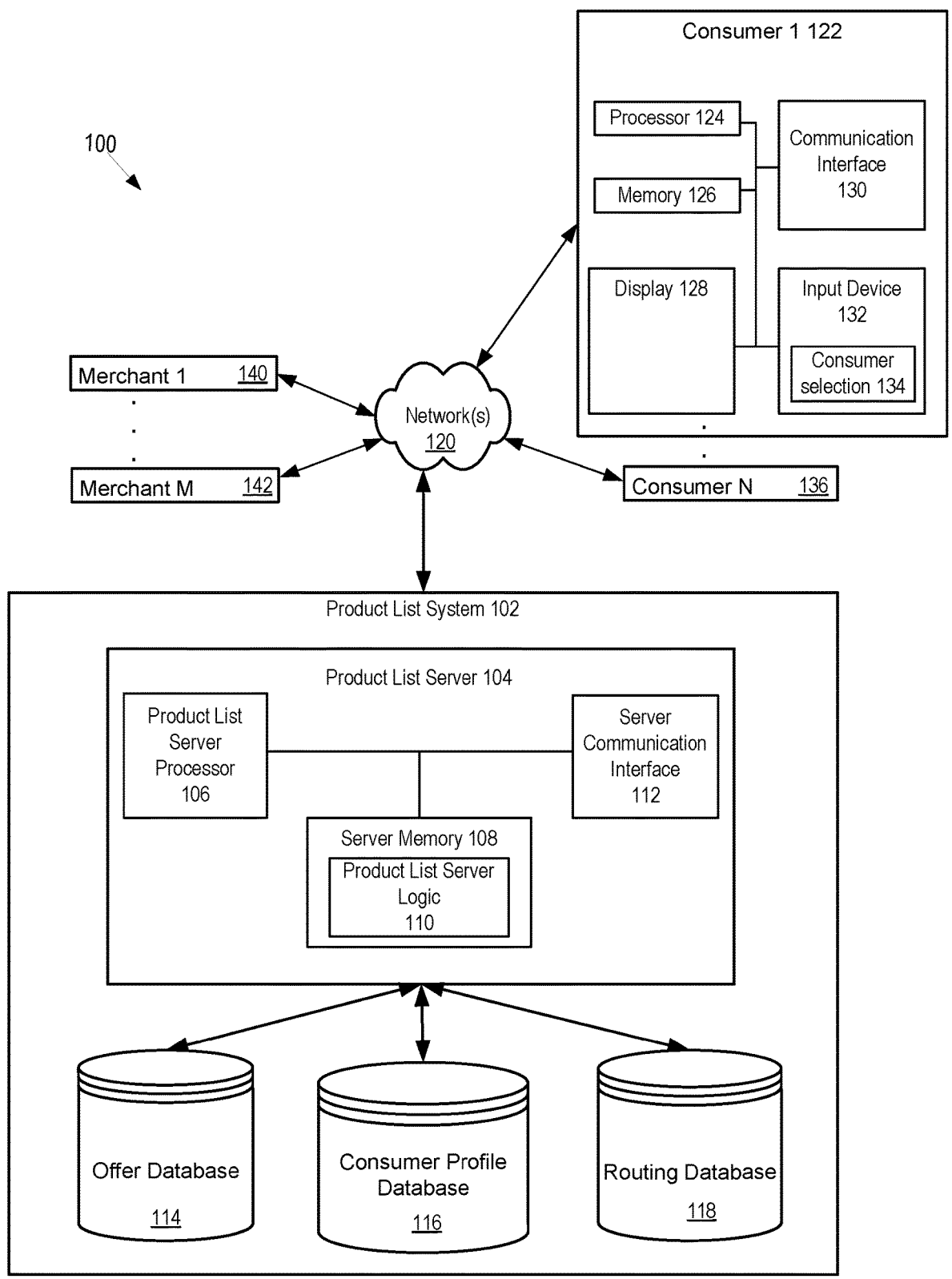
FIG. 1 shows a representation of a network and a plurality of devices that interact with the network, including one or more merchant devices, one or more consumer devices and a product list system.

The principles described herein may be embodied in many different forms. Not all of the depicted components may be required, however, and some implementations may include additional, different, or fewer components. Variations in the arrangement and type of the components may be made without departing from the spirit or scope of the claims as set forth herein. Additional, different or fewer components may be provided.

In one aspect, the product list system may generate a product list. The product list may comprise a shopping list, such as a list of purchases to be made. Generating the product list may be triggered in response to determining one or more life events. A life event may comprise an event that changes a respective consumer's status or circumstances. Examples of a life event include, but are not limited to: a birth; a marriage; a divorce; a death; a loss of job; a vacation; a graduation; or a military deployment. As discussed in more detail below, a consumer may have an associated consumer profile. In this regard, the determination of the consumer's life event may be based, in whole or in part, on the associated consumer profile. Further, the determination may be performed automatically or manually. As one example, the product list system may analyze one or more attributes of the consumer profile in order to determine the occurrence of a life event. As another example, the consumer may input information (either by explicitly indicating a life event or modifying an attribute of the consumer profile indicative of a life event) used by the product list system to determine the life event.

A data construct or data structure may correlate the life event to a list of products. Types of data constructs include, but are not limited to, a look-up table, a linked list and an array. As one example, the data construct may correlate a vacation (or a type of a vacation, such as a camping vacation, a beach vacation, a European vacation, a "staycation", etc.) to a list of products. As another example, the data construct may correlate a graduation (or a type of graduation, such as a middle school graduation, a high school graduation, a college graduation, etc.) to a list of products.

Correlation of a life event to a list of products may be performed in one of several ways. In one example, data from past purchases may be organized and analyzed in order to determine the list of products correlated to a specific life event. More specifically, the data may be tagged or identified as being correlated to the specific life event (such as identified as being associated with a military deployment). The product list system may then analyze the purchases associated with the specific life event to determine the list of products correlated to the specific life event. In the example of a military deployment, the product list system may analyze the data tagged as being for a military deployment, and may determine the products that are purchased in response to a military deployment (such as the top "N" products that are indicated as purchased based on the tagged data. As another example, the data may be identified as being correlated to a specific life event and correlated to one or more consumer attributes (such as the age of the consumer, the gender of the consumer, the location of the consumer (e.g., home location, work location, vacation location), the income bracket of the consumer, etc.). The product list system may then analyze the purchases associated with the specific life event and the one or more consumer attributes to determine the list of products correlated to the specific life event and the one or more consumer attributes. In this example, there may be two inputs to the data construct (the attribute(s) of the consumer and the life event) and one output (the list of products). More specifically, the data may be identified as being correlated to a military deployment and correlated to a consumer 18-24 years old. The product list system may, for example, determine the top 5 products purchased by 18-24 year olds that are preparing for military deployment. Further, the product list may be autocompleted.

In another aspect, the product list system may link an offer to the product list. The offer may comprise a promotion, deal, discount, reward, credit, voucher, deal, or the like used toward part (or all) of the use, purchase or ownership of a product or a service. The offer may be: storewide (e.g., all the items purchased at a particular store); by category (e.g., for a certain category of items, such as dairy products); or for an individual item. The offer may be generally linked to the product list, or may be linked to a specific product (or a specific set of products) within the product list.

In one example, the product list system may associate offer(s) with the product list based on at least one aspect of the product list (such as a specific product within the product list or the life event associated with the product list). More specifically, the product list system may search an offer database based on one, some or all of the products within the product list.

For example, one of the products in the list may be for a particular brand of breakfast cereal product. The product list system may search the offer database for offers for the particular brand of breakfast cereal product. In the event that the offer database has an offer for the particular brand of breakfast cereal product, the product list system may link the offer to the entry of the particular breakfast cereal product in the list. In the event that the offer database does not have an offer for the particular brand of breakfast cereal product, the product list system may link the offer for a breakfast cereal product similar to the entry of the particular breakfast cereal product in the list. As another example, one of the products in the list may be for a breakfast cereal product (not directed to a particular brand). The product list system may search the offer database for offers for breakfast cereal products and link an offer from the offer database to the entry of the breakfast cereal product in the list.

In another example, the offer(s) in the offer database may be used to determine whether to include a product in the product list. As discussed above, the offer database may include one or more offers. The product list system may search the offer database in order to determine whether to include an item in the product list based on the search. The determination may be based on: the offer in the offer database (e.g., the type of item in the offer and/or the amount of discount for the item); and the consumer (e.g., based on one or more attributes of the consumer)

As one example, the attribute may indicate the distance the consumer is willing to travel for the offer. The attribute may be determined based on input from the consumer. Alternatively, the attribute may be determined based on an analysis of the consumer's travel habits to purchase the item (e.g., the amount the consumer drives to purchase the item). As another example, the attribute may indicate the location of the consumer. More specifically, the consumer profile may indicate a home location, a work location, a vacation location and other locations associated with the consumer. Further, each location may indicate a time period (time of day, day of week, week of year, etc.) when the consumer is at a respective location. For example, the consumer profile may indicate that the consumer will be on vacation in Denver Colo. the first week of August. The different locations and the respective time periods may be determined automatically (such as by analyzing consumer purchases (e.g., airline tickets)) and/or may be determined based on manual input (such as by the consumer indicating the different locations and respective times).

As still another example, the consumer attribute may indicate the item(s) that the consumer previously purchased and/or the frequency of the item(s) purchased. More specifically, the consumer may have an associated consumer profile which may include data of previous purchased items. From the data, a frequency that the item is purchased may be determined. More specifically, for an item (such as breakfast cereal) or a specific item (such as a specific brand of breakfast cereal), the data may indicate a frequency of purchase (such as once every two weeks). Alternatively, the data may indicate a frequency of purchase without an offer and may indicate a frequency of purchase with an offer (e.g., the consumer purchases the item more frequently with an offer). Given the frequency of purchase of the item, a purchase window may be determined, which indicates when the item is typically purchased (e.g., once every two weeks, or once every 4-6 weeks). Given the date of the last purchase of the item, the product list system may determine whether the current time is within the purchase window associated with the item. The purchase window may thus indicate the time period during which the consumer may be amenable to purchasing the item.

For example, the system may access a consumer profile that includes purchase information associated with the consumer. The purchase information may thus be used to determine an item for purchase by the consumer. In particular, the purchase information may indicate both the item and/or the brand of the item that the consumer has previously purchased. The consumer profile may likewise include information regarding a purchase window. Based on the purchase window and on previous purchases of the consumer (e.g., when the consumer most recently purchased the item), the system may determine whether the consumer is scheduled to purchase the item. For example, the system may determine, based on the frequency of purchase of the item and based on the last purchase of the item, whether the consumer is within the purchase window for purchase. Using the example of a purchase window of 3 weeks, a frequency of purchasing every 6 weeks, and a last purchase 5 weeks ago, the system may determine that the consumer is within the purchase window. The system may further determine whether there is a consumer promotion associated with the item. More specifically, the system may determine whether the promotion for the item is at least or greater than a predetermined amount (e.g., at least 25% off). In response to determining that there is a promotion for the item (e.g., there is a promotion associated with the item in a database of promotions) and in response to determining that the consumer is within the purchase window (e.g., the consumer is scheduled to purchase the item), the item is included in a shopping list associated with the consumer, and an alert with the shopping list (and/or a link to the shopping list is included in the alert).

The purchase window may be a predetermined time range that is periodic in nature (e.g., every 2 weeks). Further, the purchase window may be determined based on previous purchases of the consumer (e.g., based on the consumer profile. For example, the purchase window may be determined by: determining, based on the previous purchases, a frequency of purchase of the item; and determining, based on the frequency of purchase, the purchase window.

Further, determining whether the consumer is scheduled to purchase the item may include: accessing purchase history by the consumer of the item to determine the last time the consumer purchased the item; determining a frequency of purchase of the item; determining, based on the frequency of purchase of the item and the last time of purchase of the item, an estimated time for next purchase of the item; determining whether the estimated time for next purchase of the item is within the purchase window; and in response to determining that the estimated time for next purchase of the item is within the purchase window, determining that the consumer is scheduled to purchase the item.

The database of the consume promotions may comprise, for example, online promotions. In that regard, the system may search an online database (which may be associated with the system or may be separate from the system) in order to determine whether a promotion is associated with the item. In this regard, the alert sent to the consumer may include a link to a web address for downloading a webpage for the online promotion associated with the item or a barcode indicative of the online promotion associated with the item.

As discussed above, an alert may be sent to the consumer. The timing of sending of the alert to and/or the display of the alert at the electronic device associated with the consumer may depend on one or more factors. For example, the alert may be displayed on the electronic device associated with the consumer responsive to monitoring the location of the consumer relative to the predetermined location of a store. In particular, the alert may be displayed in response to determining that a current location of the consumer is less than a predetermined distance from the predetermined location of a store. As another example, the alert may be displayed in response to determining that a current location of the consumer is less than a predetermined distance from a predetermined home location of the consumer.

In still another aspect, the product list system may facilitate the collaboration amongst multiple consumers to: generate the product list; disseminate the product list; and/or purchase items from the product list. As one example, the product list system may facilitate the generation of one or more product lists amongst multiple consumers.

In one embodiment, the product list system may provide a platform by which multiple consumers may submit items. The product list system may receive the submitted items from the multiple consumers, compile a product list from the submitted items, reconcile the list (e.g., remove duplicates, add items based on submitted items), and may disseminate the list.

Alternatively, the product list system may analyze the profiles associated with one, some, or all of the consumers associated with a group in order to generate the product list. In one example, the analysis may generate a product list of general items. In another example, the analysis may generate a product list of specific items.

After the product list is generated, the product list may be disseminated to one, some or all of the consumers associated with a group. The dissemination of the list may be in one of several ways. In one example, each of the consumers in the group may receive a push-type communication, such as an email, SMS or the like, which includes the product list. As another example, each of the in the group may receive a push-type communication that includes a link to a pull-type communication (such as a link to an Internet webpage, a link to a social media outlet (such as a link to Twitter® online social networking service). Activation of the link may result in the download of the product list to the consumer's device.

The product list disseminated to the group may be managed by one, some or all of the consumers in the group. The management may comprise: modifying one or more entries on the product list; designating who will purchase which items on the list; and/or updating one or more entries on the list based on consumer actions.

As discussed above, the product list includes entries for items to purchase, with the product list being associated with a group of consumers. The product list system enables modification of one or more entries on the product list, and assignment of entries to consumers within the group for the consumers to purchase. In one embodiment, each of the consumers in the group may modify any of the entries on the product list, and may assign entries to consumers for purchase. Alternatively, less than all of the consumers in the group may modify and/or assign any of the entries on the product list. As one example, a single consumer in the group of consumers may be designated with the ability to modify and/or assign entries on the product list. As another example, different consumers in the group may be assigned different rights. For example, a first set of consumers in the group may be assigned a first set of rights, and a second set of consumers in the group may be assigned a second set of rights, with the first set of rights being different than the second set of rights. More specifically, the first set of consumers may be assigned all rights to modify the entries on the product list (e.g., delete an entry, add an entry, and substitute an entry) whereas the second set of consumers may be assigned less than all rights to modify the entries on the product list (e.g., assigned the right to add entries, but not the right to delete or substitute entries).

The designation of rights may be based on consumer input (e.g., based on voting from the consumers in the group) or may be performed automatically (e.g., based on the product list system analyzing the profiles associated with the consumers in the group and selecting a consumer based on status or rank).

As discussed above, the entries in the product list may be: (1) modified (e.g., delete an item from the list, add an item from the list, substitute an item on the list); and/or (2) assigned to different consumers within the group for purchase. Entries may be modified based on manual input from the consumers. In one embodiment, all consumers in the group have rights to modify entries, as discussed above. In response to receiving input from the consumer, the product list system may modify one or more entries in the list. In an alternate embodiment, different consumers in the group have different rights to modify entries. In response to receiving input from the consumer, the product list system may first determine whether the consumer sending the input has the right to modify. In response to determining that the consumer has the right to modify entries, the product list system may modify one or more entries in the list. In response to determining that the consumer does not have the right to modify entries, the product list system may reject the request to modify entries in the list, and may optionally send a communication to the consumer indicating the rejection of the request to modify. Further, in response to the product list system modifying one or more entries in the list, the product list system may push the modified list (or may push a link to the modified list) to the consumers in the group.

Similarly, entries in the product list may be assigned to different consumers within the group for purchase. In one embodiment, the assignment of the entries may be based on manual input by the consumers. For example, the entries in the product list may be sent to the consumers in an email. The email may further include indicators associated with one, some or all of the entries in the product list (such as a checkbox associated with one, some, or all of the entries in the product list). A respective consumer may reply to the email with an indication which of the entries the respective consumer wishes to purchase (such as checking the checkbox associated with entries that the respective consumer wishes to purchase). In response to receiving the reply email, the product list system may review the reply, determine the respective consumer sending the reply, determine which checkboxes are checked, and assign the respective consumer with purchasing the entries associated with the checkboxes checked.

In the event that more than one consumer selects an entry in the product list, the product list system may reconcile the selection of an entry in the product list by more than one consumer in one of several ways. As one example, the product list system may select the consumer, from amongst the consumers that have selected an entry to purchase, based on rank of the consumer. As discussed above, each of the consumers may have an associated profile. The associated profile may indicate a rank, such as a length of time that a respective consumer has been associated with the group. The product list system may therefore select the consumer who has the highest rank amongst the consumers that have selected an entry to purchase. As another example, the product list system may send subsequent communications to the consumers that have selected the entry to purchase in order for the consumers to arbitrate which respective consumer will ultimately be assigned to purchase the entry. To assist in the decision, the product list system may send emails to the consumers that have selected the entry to purchase. The emails may include information to assist the consumers to arbitrate which specific consumer will be selected to purchase the entry. The information may include, for each of the consumers that selected the entry for purchase, a total number of items that a respective consumer has selected to purchase and/or an estimated cost for the number of items that the respective consumer has selected. In this regard, the consumers may arbitrate who should purchase an entry.

As still another example, the product list system may select which one consumer, from amongst the consumers that selected the entry in the product list, by analyzing the other products selected by the consumers. More specifically, a first consumer may select a first set of entries, such as entry #1, entry #3, and entry #7 in the product list. A second consumer may select a second set of entries, such as entry #1 and entry #5 in the product list. The product list system may analyze the products selected (such as based on the number of total products selected, or based on the total cost of purchasing the products selected) in order to determine which consumer to assign the entry to. In the example given, the second consumer has selected two entries whereas the first consumer has selected three entries. In order to make the number of purchases on the list more equal, the product list system may assign the purchase to the second consumer. Alternatively, the product list system may estimate the cost of purchasing the selected items, and assign the purchase to the consumer which equalizes the cost of purchasing. In the example given, the product list system may estimate the cost to the first consumer of purchasing entry #1, entry #3, and entry #7 to be $10.00 and the cost to the second consumer of purchasing entry #1 and entry #5 to be $15.00. In order to equalize the cost, the product list system may assign the purchase to the first consumer.

In an alternate embodiment, the assignment of the entries may be at least partly (or entirely) made automatically by the product list system. The product list system may analyze profiles associated with one, some, or all of the consumers in the group in order to determine whether to assign an entry to a respective consumer. As one example, the analysis may determine the location at which to purchase the entry and the respective consumer, from amongst all of the consumers in the group, that is closest to the location. As another example, the analysis may determine items previously purchased by consumers in the group and select the consumer within the group that has previously purchased the entry.

In addition, the entries on the list may be updated based on purchases from consumers within the group. In one embodiment, the updating based on purchases may be performed automatically. As discussed in more detail below, the product list system may receive a listing of purchases that consumers in the group have made. The product list system may review the purchases in order to determine whether an entry on the product list was purchased by a consumer within the group. In one implementation, in the event that the product list system determines that the consumer has purchased a product that matches an entry in the product list, the product list system may designate that the entry has been purchased. The product list system may then send a push communication with a list of entries that remain on the list for purchase, and may also include a list of entries that have already been purchased. In another implementation, in the event that the product list system determines that the consumer has purchased a product that matches an entry in the product list, the product list system may communicate with the consumer to determine whether the purchase relates to the entry in the product list. The consumer may send a reply communication confirming or denying whether the purchase relates to the entry in the product list.

In an alternate embodiment, the consumer may provide input in order for the product list system to update the entries on the list. After making a purchase, the consumer may send a communication to the product list system indicating which entries on the product list the consumer purchased.

The product list, once generated, may be used for a variety of purposes. In one embodiment, the product list may be used for budgeting purposes. For example, a consumer may wish to receive information whether the product list is within a budget. In one aspect, the consumer budget may define the budget prior to generating a product list. For example, the consumer may submit information indicating how much the consumer wishes to spend. More specifically, the consumer may submit budget information for different areas of spending, such as groceries, restaurants, nightlife, vacations, etc. In this regard, the consumer may indicate a budget for any time period, such as a weekly or monthly grocery budget. In another aspect, the product list system may analyze previous purchases from the consumer and present a budget based on the analysis. For example, the product list system may analyze previous grocery purchases by the consumer. Based on the analysis, the product list system may determine an average grocery budget.

Based on the determined budget, the product list system may compare the budget with the product list. In this regard, the product list system may analyze whether the product list is within the budget (e.g., whether the product list exceeds the budget, and if so, by how much). Alternatively, or in addition, the product list system may indicate how much of the budget the consumer is spending in purchasing items from the product list. For example, the product list may be for weekly grocery shopping. The product list system may indicate how much of the grocery budget the consumer is spending when purchasing the items from the product list. In the case of a weekly grocery budget, the product list system may indicate whether the product list (which is for weekly grocery shopping) compares with the weekly budget. In the case of a monthly grocery budget, the product list system may indicate whether the product list (which is for weekly grocery shopping) compares with how much of the consumer's monthly budget is spent purchasing items on the product list.

In another embodiment, the product list system may be used to determine the payment mechanism. A consumer may pay for one, some, or all of the items on the product list in a variety of ways. Examples of payment mechanisms include, but are not limited to, paying with: cash; electronic funds transfer at point of sale (EFTPOS) (which includes debit cards (such as bank sponsored debit cards, merchant sponsored debit cards), credit cards, and charge cards; check; ATM card (also known as a bank card or cash card); layaway; gift cards; etc.

Each payment method may have associated benefits and associated costs. For example, certain payment mechanisms may have interest charges, use fees, etc. As another example, certain payment mechanisms may have rewards, which may include: an immediate reduction at the point-of-sale (e.g., 5% off of the total purchase); a cashback reward (e.g., the consumer may receive a check months after purchase for a percentage of the purchase); other benefits toward the purchase of a product or service (such as miles toward the purchase of an airplane ticket).

For example, many credit cards offer rewards and benefits packages, such as: frequent flyer points; gift certificates; cash back; enhanced product warranties at no cost; free loss/damage coverage on new purchases; various insurance protections (e.g., rental car insurance, common carrier accident protection, and travel medical insurance). The rewards or benefits are generally tied to purchasing an item or service on the credit card.

The evaluation of the different payment mechanisms may be for a single good or service, or for multiple items of goods or services. In this regard, the evaluation of the different payment mechanisms may be used in combination with the product list, discussed herein. For example, the product list generated by the product list system may be used to: (1) calculate a total cost of purchase of items from the product list; and/or (2) calculate the cost of individual items from the product list. As discussed in more detail below, evaluation of different payment mechanisms may be based on the total cost of purchase. Alternatively, or in addition, evaluation of different payment mechanisms may be based on individual items for purchase. In this regard, the product list system may provide a recommendation to the consumer as to which payment mechanism to use in paying for one, some or all of the products in the product list.

Alternatively, the evaluation of the different payment mechanisms may be used separately from any product list as discussed herein. For example, a consumer may purchase a good or service, such as buying a television at an electronics store or paying for a meal at a restaurant. The evaluation of the different payment mechanisms may be performed at or just prior to paying for the good or service.

The product list system may analyze multiple payment mechanisms from amongst the available payment mechanisms. In one aspect, the product list system may determine the available payment mechanisms in one of several ways. One way comprises accessing a consumer profile. The consumer profile may include a listing of payment mechanisms previously used by the consumer, such as one or more credit cards previously used, one or more debit cards previously used, etc. Another way comprises presenting a list of available payment mechanisms to the consumer (such as presenting the list at checkout), and receiving input from the user as to the available payment mechanisms. Still another way comprises the product list system selecting the most commonly used payment mechanisms (e.g., most commonly used amongst all consumers, amongst a subset of consumers (such as males aged 30-39), etc.).

In response to the product list system determining the available payment mechanisms, the product list system may analyze the benefits and costs associated with one, some, or all of the available payment mechanisms. The analysis may focus on one or both of the following: (1) analysis of the available payment mechanisms; and/or (2) analysis of the consumer. The analysis of the available payment mechanisms may include analyzing the benefits and costs associated with the available payment mechanisms. The analysis of the consumer may include analyzing one more factors including: consumer preferences; consumer's previous selections of payment mechanisms; consumer's payment history. Consumer preferences may include input from the consumer providing a preference as to payment mechanism(s) (such as a preference for credit card payments versus debit card payments). Consumer preferences may further relate to consumer goals. The consumer may previously have input various goals, such as financial goals, budgetary goals or the like. The product list system may analyze the consumer's goals, and based on the benefits/ costs of the different payment mechanisms, recommend a specific payment mechanism.

The product list system may further analyze the consumer's previous selections of payment mechanisms. The consumer's profile may include information as to the payment mechanisms previously used. The previous payment mechanisms used by the consumer may be factored into the recommendation (such as providing a weight which indicates a preference of the consumer).

As discussed above, the analysis may focus on the entire purchase (such as the cost in purchasing the entire list of goods in the product list). Alternatively, the analysis may focus on individual items for purchase. For example, in the event of a benefit associated with a single item in the purchase (such as a promotion associated with an item (e.g., a reduction in the cost of the price of the item, additional rewards if the item is purchased (e.g., double miles for certain items purchased), a benefit (such as insurance, an extended warranty, or the like) is associated with an item), the product list system may analyze the benefit for the single item separately. As another example, the product list system may analyze the entire purchase, such as the cost associated with the entire purchase.

Further, the analysis may focus on the consumer's payment history. For example, the consumer may have a history of paying credit card purchases monthly to avoid incurring credit card interest fees. In this instance, there is no additional cost for the consumer in paying by credit card. As another example, the consumer may have a history of paying credit card purchases in installments, thereby incurring credit card interest fees. The product list system may analyze the payment history of the consumer in order to calculate the "true" cost of paying by a specific credit card (e.g., accounting for the specific credit card's interest fees and the likely time period when the consumer will eventually pay for the incurred debt).

Optionally, in response to the analysis of the benefits and costs associated with one, some, or all of the available payment mechanisms, the product list system may recommend one of the available payment mechanisms. The recommendation may be in the form of ranking some or all of the available payment mechanisms. Alternatively, the recommendation may be in the form of recommending a single available payment mechanism. The recommendation may be accompanied by the benefits and costs associated with the available payment mechanisms.

Alternatively, the product list system may not provide a recommendation. Instead, the product list system may provide the benefits and costs associated with one, some, or all of the available payment mechanisms, without any recommendation to the consumer.

In an alternate embodiment, the product list may be used for routing purposes. In one aspect, the product list system may be configured to generate a route to one or more stores to purchase items from the product list. As discussed above, the product list system may generate a product list for purchase. In combination with (or separate from) generating the product list, the product list system may generate route(s) to stores.

For example, the product list system may select one or more stores depending on any one (or combination) of the following criteria: consumer's location; consumer's purchasing history; store location; store promotions; store items offered; and prices of items. For example, the product list system may determine which stores are within a predetermined radius of the consumer's location. Based on the stores within the predetermined radius, the product list system may narrow the number of potential stores based on the items offered in the store (e.g., whether the store offers items on the product list), based on the store's prices of or promotions related to the items on the product list (e.g., the product list system may rank the stores based on total cost of the items), and/or based on the consumer's purchasing history (e.g., whether the consumer has purchased items at a respective store.

Based on the analysis, the product list system may generate a list of potential stores (or a list of combinations of stores). For example, in one aspect, the product list system may generate a list of potential stores, rank the potential stores, and send some or all of the ranked potential stores to the consumer for review. As discussed above, the list of potential stores may be generated in one of several ways. Further, the ranking of the potential stores may be based on one or more factors including any one or any combination of the following: (1) total cost of the items; (2) distance of the consumer to the store; (3) rewards (e.g., any type of rewards as disclosed herein such as store rewards programs, cashback, etc.); and/or (4) cost of travel to the store (e.g., time cost for the consumer to travel to the store and/or monetary cost (such as in terms of cost spent on gas to drive to the store)). As discussed above, the product list system may send some or all of the ranked potential stores to the consumer for review, and optionally additional information. The additional information may include any one or any combination of the following: (1) total cost of the items; (2) distance of the consumer to the store; (3) rewards; and/or (4) cost of travel to the store. The consumer may select one of the potential stores. In response, the product list system may send to the consumer directions to the selected store (such as sending directions to the consumer's smartphone).

As another example, the product list system may generate a list of combinations of potential stores, rank the combinations, and send some or all of the ranked combinations to the consumer for review. The combinations of potential stores may be generated based on consumer's location, consumer's purchasing history, store location, store promotions, store items offered, and/or prices of items, as discussed above. Further, the ranking of the combinations of potential stores may be based on one or more factors including any one or any combination of the following: (1) total cost of the items from the combination of potential stores; (2) distance of the consumer to the combination of potential stores; (3) rewards; and (4) cost of travel to the combination of potential stores. As discussed above, the product list system may send some or all of the ranked combinations of potential stores to the consumer for review, and optionally additional information. The additional information may include any one or any combination of: (1) total cost of the items; (2) distance of the consumer to the combination of potential stores; (3) rewards; and/or (4) cost of travel to the combination of potential stores. The consumer may select one of the combinations of potential stores. In response, the product list system may send directions to the selected combination.

Optionally, routing to the combination of potential stores may further be based on the type of items for purchase. As one example, routing may be based on what is being purchased, such as frozen foods. In this regard, the sequence of the combination of potential stores is set based on type of items purchased at the different stores. For example, in the event that frozen foods are on the list of items, the store at which the frozen foods are purchased may be scheduled later in the route, such as at the end of the route.

Routing may also optionally use the mobile electronic device functionality as an input for generating a route or as an output for highlighting a route. Electronic mobile devices, such as smartphones, include various functionality in addition to mobile telephone functionality. Additional functions may include directional functionality (such as GPS receiver, gyroscope, magnetometer (or other compass-like functionality), accelerometer, or other type of navigation functionality), digital camera functionality, and/or video camera functionality. For example, smartphones may access magnetometer functionality in order to provide direction information (such as which direction the smartphone is pointed), GPS receiver information (either from a GPS receiver resident in the smartphone or from a wireless connection to an external GPS receiver) in order to provide coordinates for the smartphone, or other directional information. The routing may be integrating with one or more of the additional functions. For example, the directional functionality, the digital camera functionality and/or the video camera functionality may be used as an input and/or an output for routing.

In one aspect, functionality of the smartphone, such as directional functionality, may be used as an input for routing. For example, the direction of the smartphone may be used in order to select one or more stores and/or one or more routes to the selected stores. As discussed above, various sensors may be used in order to indicate a direction that the smartphone is (e.g., a direction in degrees, such as 0° to 360°). The product list system may use the direction of the smartphone (in combination with the GPS position of the smartphone) as input to select a subset of stores and/or select routes to the subset of stores. For example, the product list system may determine a set of available stores based on the GPS position of the smartphone. More specifically, the product list system may determine the set of available stores based on a geographical distance from the GPS position of the smartphone. In one embodiment, the geographical distance may be static and fixed. In an alternate embodiment, the geographical distance may be dynamic and changeable. For example, the geographical distance may be changeable based on input from the consumer (e.g., the consumer may indicate the distance the consumer is willing to travel to stores). As another example, the product list system may analyze at least one aspect of the consumer (such as whether the consumer is driving in a car or whether the consumer is walking on the street) to determine the geographic distance. In response to the product list system analyzing at least one aspect of the consumer, the product list system may select the geographic distance (e.g., in the event the product list system analyzes a sequence of GPS coordinates from the smartphone to determine that the consumer is likely driving, the product list system may select a first geographic distance (e.g., 5 miles); in the event the product list system analyzes a sequence of GPS coordinates from the smartphone to determine that the consumer is likely walking, the product list system may select a second geographic distance, which is less than the first geographic distance (e.g., 0.5 miles)).

After accessing the geographical distance, the product list system may determine the available stores within the geographical distance. In one aspect, the product list system may determine all of the available stores within the geographical distance. In another aspect, the product list system may determine all of the available stores of a certain type (such as grocery stores) within the geographical distance.

After determining the available stores within the geographical distance, the product list system may use the direction of the smartphone in order to select a subset of the available stores. For example, the product list system may center an angle around the direction of the smartphone. More specifically, if the direction of the smartphone is 260°, the product list system may select an angle of 20° around 260° (from 250° to 270°). The available stores in the wedge, as defined by a starting point of the GPS coordinates of the smartphone, the lines of the geographical distance at 250° to 270°, are selected.

The predetermined angle may be static or may be dynamic (such as selected based on the display of the particular smartphone). Further, the selection of the subset of available stores may be dynamic as well based on a dynamic direction of the smartphone. For example, the consumer may spin in a 360° direction to get a sense as to all of the available stores that are around the consumer.

In another aspect, functionality of the smartphone, such as the digital camera functionality and/or the video camera functionality, may be used as an output for routing. Once the subset of available stores is selected, the data associated the subset of available stores selected may be combined with the data from the digital camera functionality and/or the video camera functionality. For example, the data associated the subset of available stores selected may be superimposed on the data from the digital camera functionality so that the consumer may view the subset of available stores in a real-time context. The superimposed data associated with the subset of available stores selected may comprise an icon associated with a respective store and/or may comprise information about the store (such as one or any combination of the following: the name of the store; the item from the consumer's product list for purchase at the store; the price of the item at the store; the distance to the store from the current GPS location; etc.). In this regard, the consumer may select the icon (such as by tapping on a touchscreen of the smartphone) in order to receive directions to the respective store. For example, after the consumer selects the icon associated with a respective store, the product list system may push directions for output onto the smartphone (such as voice directions, directions overlaid onto the digital image produced by the smartphone, or text directions).

In still another aspect, virtual perimeters may be used to notify a consumer of proximity thereto. One example of a virtual perimeter is a geo-fence. The product list system may configure a geo-fence around a store. The product list system may configure the geo-fence around the store in response to input from the consumer and/or in response to an automatic determination by the product list system. For example, the consumer may submit input to the product list system indicating a desire to purchase an item from a store or indicating a desire to visit a store. As another example, the product list system may determine an item for purchase (or a store of interest) to the consumer.

In this regard, a geofence may be one way in which the system may determine whether to send an alert to the consumer. In particular, the system may access a consumer profile associated with the consumer. The consumer profile may comprise history of consumer purchases and/or information as to items that the consumer wishes to purchase. Based on the consumer profile, the system may thus determine the item for purchase by the consumer.

The system may monitor the location of the consumer (such as monitor a dynamically changing location of the consumer). For example, the consumer may have an associated electronic device with positioning functionality (e.g., a GPS receiver). The associated electronic device of the consumer may send the dynamic location of the consumer to the system in order for the system to monitor the location of the consumer. Further, based on the location of the consumer, the system may determine a location of a store which sells the item. This determination of the store that sells the item may be dependent on or independent of the consumer profile. As one example, the system may examine the consumer profile for previous purchases to determine the stores at which the consumer purchased the item (or a similar item). As another example, the system may examine which stores offer the item for purchase. In particular, the system may monitor stores that are proximate to the consumer (e.g., within a predetermined distance) and determine whether those monitored stores sell the item. The system may then determine whether the distance between the location of the consumer and the store location is less than a predetermined distance. The predetermined distance may be consumer configurable and/or system configurable. If so, the system may send an alert to the consumer, with the alert indicating that the item is available for purchase at the store location of the store and indicating the distance to the store location and with the alert being displayed responsive to determining that the distance is less than the predetermined distance.

For example, the system may comprise a central server that is configured to monitor the location of the consumer relative to the store location, and responsive to determining that the location of the consumer relative to the store location is less than the predetermined distance, send the alert to the electronic device associated with the consumer, with the electronic device associated with the consumer, responsive to receipt of the alert, displaying the alert. In this way, the central server may time the sending of the alert to the electronic device associated with the consumer so that, when the electronic device associated with the consumer receives the alert and immediately displays, the timing is such that the consumer views the alert at the desired time. As another example, the server may send the alert to the electronic device associated with the consumer, with the alert also including instructions to the electronic device associated with the consumer when to display the alert. In particular, the electronic device associated with the consumer may be configured to monitor the location of the consumer relative to the store location and responsive to determining that the location of the consumer relative to the store location is less than the predetermined distance, output the alert on a display of the electronic device associated with the consumer. In this way, the electronic device associated with the consumer may determine the timing of display of the alert. As still another example, the alert may activate an application on an electronic device associated with the consumer to display the alert and to enable connection via the link to the shopping list over the Internet. As yet another example, the consumer profile may include information as to times during which the consumer is at a predetermined location (such as at the consumer's home). The system may send the alert to the consumer responsive to the distance being less than the predetermined amount and responsive to determination that the consumer is in the predetermined location at the time of day outlined in the consumer profile.

The system may thus use various factors to determine whether, and when to send the alert to the consumer. Specifically, the system may also monitor a frequency at which the consumer purchases items (and more particularly purchases items at a particular store). For example, the consumer profile may include information as to the frequency at which the consumer shops and/or the frequency at which the consumer shops at the store subject to the alert. In particular, the system may determine that the consumer shops for a particular item or at a particular store every three weeks. Given this, the system may monitor the consumer's position approximately three weeks after the last purchase of the particular item or the last visit to the particular store and, depending on proximity to a location that sells the item, send the alert to the consumer. Alternatively, or in addition, the system may monitor promotions for the item. In this regard, the system may determine distance from the store offering the promotion and the frequency of purchasing of the item in order to determine whether to send the alert to the consumer.

In response to determining that the consumer seeks to purchase an item (such as based on a product list discussed above), the product list system may select a store (or stores) to configure a geo-fence for purchase of the item. In this regard, when the consumer is within the configured geo-fence, the consumer receives a notification. The notification may indicate the location of the store, and other information (such as any one or any combination of the following: the distance to the store; the item for purchase at the store; the cost of the item; directions to the store; any promotions offered by the store (such as a coupon); etc.).

Configuring geo-fences may be dynamically performed based on one or more aspects. For example, geo-fences may be configured dynamically based on one or more items desired by the consumer. As another example, geo-fences may be configured dynamically based on promotional offers. More specifically, the product list system may review promotional offers for products or services and may review a predetermined threshold for consumer notification. In the event that the promotional offer for the product or service is within the predetermined threshold for consumer notification and in the event that the consumer is within the virtual perimeter, the product list system sends a notification to the consumer. The predetermined threshold for consumer notification may be set by the consumer and/or may be set by the product list system. For example, the consumer may indicate that the consumer wishes to receive a notification if the consumer is within 1 mile of a gas station that is selling gas less than or equal to $3.50/gallon. In this regard, the product list system may monitor the location of the consumer (such as by monitoring GPS coordinates generated by the smartphone associated with the consumer), and may check for gas stations that are within a predetermined distance of the GPS coordinates. In the event that the consumer is within 1 mile of a gas station that is selling gas less than or equal to $3.50/gallon, the product list system is configured to notify the consumer via the smartphone. As another example, the product list system may review the previous purchases of the consumer to determine that the consumer purchases low-fat milk when the cost is less than $2.00/gallon. In response to this determination, the product list system may monitor the location of the consumer, and may check for grocery stores that are within a predetermined distance of the GPS coordinates. In the event that the consumer is within 1 mile of a grocery store that is selling milk for less than $2.00/gallon, the product list system is configured to notify the consumer via the smartphone. As still another example, the consumer may indicate an interest in purchasing a certain brand of cereal for less than a predetermined amount. The product list system may search a promotions database to determine whether there are any stores that currently offer the certain brand of cereal for less than a predetermined amount. In response to the product list system determining a particular store that currently offer the certain brand of cereal for less than a predetermined amount, the product list system may configure geo-fences around one, some, or each location of the particular store so that the consumer receives a notification in the event that the consumer is within one of the geo-fences.

The geo-fence may be configured for a general category of store. For example, in the example of a grocery item, the geo-fence may be configured for any store selling the grocery item. Alternatively, the geo-fence may be configured for a specific type of store. For example, the product list system may select Target® stores based on analysis of the consumer's previous purchase history. In response to the selection, the product list system may configure a geo-fence around each Target® store location. Or, the geo-fence may be configured for a particular location of a specific type of store. In the example of the product list system may selecting Target® stores based on analysis of the consumer's previous purchase history, the product list system may select a specific Target® store location, such as based on the consumer's previous purchase history.

As discussed above, routing may be used to assist the consumer in purchasing the items. The routing may be to the store and/or within the store. In one example where the one or more items are purchased from a single store, the product list system is configured to generate routing instructions for the consumer from a starting position to the single store. The starting position may comprise a predetermined starting position (such as the home location or work location of the consumer, as indicated in a consumer profile). Alternatively, the starting position may comprise a dynamic starting position (such as the current GPS position of the consumer, as indicated by the consumer's smartphone). The directions to the single store may be sent to the consumer's portable electronic device, such as the consumer's smartphone. In one embodiment, the product list system (or a navigation server in communication with the product list system) may monitor the dynamic position of the consumer's portable electronic device.

Once the product list system (or the navigation server) determines that the consumer's portable electronic device is at the single store, the product list system (or the navigation server) may send in-store directions to the consumer's portable electronic device. The in-store directions may comprise directions to locations of one or more items within the single store. As discussed above, the product list system may generate a product list that includes one or more items. The in-store directions may comprise directions to one, some, or all of the items on the product list.

The in-store directions may take one of several forms. In one example, the in-store directions may comprise a map of the layout of the store with "X"s (or other designation) to indicate the location of an item within the store. More specifically, the map of the layout of the store may include designations for the aisles of the store with an "X" indicating the point in the aisle at which the item is displayed (e.g., an "X" in the middle of aisle 12 indicating where the peanut butter is stocked). In addition to the "X" (or other designation), other information may be presented on the map of the layout including, without limitation, any one or combination of the following: the title of the item; the cost of the item; substitute items available (and associated prices); and promotions for the item (including coupons).

In another example, the in-store directions may comprise text or audio directions. The text or audio directions may list the directions item-by-item within the store. In the example of the first item being a jar of peanut butter, the directions may include the following: process to aisle 12 to the middle of the aisle, bottom shelf, in order to obtain the peanut butter jar. Similar to the example above, additional information may be included. The product list system may monitor the location of the consumer within the store in order to dynamically send directions to the consumer. For example, the text/audio may be sent to the consumer based on the consumer's location within the store. More specifically, the product list system may monitor the location of the consumer within the store in order to determine when to send the text/audio. In illustration, the product list system may send directions to the first item to the consumer's portable electronic device, monitor the consumer's location for arrival at the first item, and after determining that the consumer is at the first item, send the directions to the second item to the consumer's portable electronic device. This procedure may be followed until all items on the product list are obtained.

FIG. 1 illustrates one implementation of a product list system 100. The product list system 100 includes a product list system 102, one or more merchants (represented by Merchant 1 (140) to Merchant M (142), one or more consumers (represented by Consumer 1 (122) to Consumer N (136), and network 120. The network 120 may include one or more wired networks, wireless networks, or combinations thereof. The wireless network may be a cellular telephone network, an 802.11, 802.16, 802.20, or WiMax network. Further, the network 120 may be a public network, such as the Internet, a private network, such as an intranet, or combinations thereof, and may utilize a variety of networking protocols now available or later developed including, but not limited to TCP/IP based networking protocols.

The product list system 102 includes a product list server 104 and one or more databases (such as offer database 114, consumer profile database 116, and routing database 118). The offer database 114 may include information related to offers for products or services.

An offer may comprise any type of promotion, reward, discount, coupon, credit, deal, voucher or the like used toward part (or all) of the purchase of a product or a service. The offer may be offered as part of a larger offer program, or the offer may be offered as a standalone one-time offer. In an effort to better distinguish and identify the offer, the offer as stored in the offer database 114 may include one or more attributes, such as the merchant offering the offer (e.g., "XYZ coffee shop"), the location of the offer, the amount of the offer (e.g., cost of acquiring or participating in the offer), the amount of discount for the offer, or the like.

The consumer profile database 116 includes profiles for the consumers, such as consumer 1 (122) to consumer N (136), that are included in the promotion system 100. As discussed above, a respective consumer profile may be associated with a specific consumer and may include one or more attributes. The attributes may include any one, or any combination of the following: name; age; address; occupation; educational background; previously accepted offers; previously rejected offers; gender; previous purchases; and the like. The attributes are merely for example purposes.

Other attributes are contemplated. As discussed below, any one, some or all of the attributes of the specific consumer may be used by the product list system 102 in determining whether to offer an offer to the specific consumer. Further, the attributes may be indicative of, or may be used to determine, different characteristics of the respective consumer. For example, an attribute may be indicative of (or may be used to determine) the respective consumer's life event. As discussed in more detail below, the consumer's life events may be used in order to determine a product list.

The routing database 118 may include mapping information for routing a respective consumer from one location to another. For example, routing may comprise directions from a starting point to an ending point. As another example, routing may be from a starting point, to one or more intermediate points, and to an ending point. In one instance, the starting point may be the consumer's home, the consumer's work, the consumer's present position, or other points of interest, and the intermediate points and end point may be a particular store, the consumer's home, the consumer's work, or other points of interest. In another instance, the starting point, intermediate point(s), and end point may be locations within a single store. In this regard, the mapping information in the routing database 118 may be used by product list system 102 in order to generate directions from one location to another, whether the locations are within a store, in different stores, etc.

FIG. 1 illustrates offer database 114, consumer profile database 116, and routing database 118 as three separate databases; however, offer database 114, consumer profile database 116, and routing database 118 may be included in one database, or in multiple databases.

The product list server 104 comprises one or more devices that communicates with merchants (represented by Merchant 1 (140) to Merchant M (142) and consumers (such as Consumer 1 (122) to Consumer N (136) across network 120 to provide functionality as described herein. The product list server 104 may communicate with merchants in order to exchange information, such as receiving offers for products or services offered by the merchant, receiving map information (such as in-store maps for the merchant's establishment), and/or receiving payment information from the merchant (such as information regarding purchasing of one or more items from the merchant).

The product list server 104 may comprise a dedicated computer or may comprise multiple networked computers. The product list server 104 includes a product list server processor 106 and product list server logic 106. As discussed in more detail below, the processor may comprise any device for analyzing and processing data. The server memory 108 may include one or more programs, such as product list server logic 110, as discussed in more detail below with respect to FIG. 2. The server communication interface 112 enables the product list system 102 to communicate via network 120.

Consumer 1 (122) comprises a device controlled by consumer 1. The device may comprise a smartphone, a tablet device, a personal computer, or any other computing device. Consumer 1 (122) includes a processor 124, a memory 126, a display 128, a communication interface 130, and an input device 132. Though not illustrated in FIG. 1, consumer N (136), merchant 1 (140), and merchant m (142) may be configured similarly to consumer 1 (122).

The memory 126 may include one or more software programs stored therein that are configured for execution by the processor 124. One type of software program for storage in memory 126 comprises an app. An app is an abbreviation for a software application. The app is a piece of software, which can run on (i) the Internet, (ii) a non-portable computer (such as, for example, a desktop computer), (iii) any operating system (OS) App compatible portable electronic device (such as, for example, phones, cellphones, smartphones, laptop computers, electronic tablets, cameras, etc.), (iv) any OS App compatible non portable device (such as, for example, home appliances or televisions), or (v) any OS App compatible semi portable embedded device (such as, for example, those found in transportation vehicles), with (ii) through (v) referred to as "OS App Compatible Devices" or "OS App Compatible Device". For example, apps may be designed for various Apple® products, such as the iPhone® smartphone, iPad® tablet computer, iTouch® media player, for various needs relating music, traveling, social networking, sports, etc. The app stored in memory 126 may be used to provide the functionality on the consumer-controlled device described herein.

The display 128 may be used to output directions, product lists, or the like as discussed herein. The communication interface 130 enables Consumer 1 (122) to communicate via network 120. Finally, input device 132 is configured to receive consumer selection 134. As discussed below, consumer selection 134 may comprise a manual input from the consumer (such as via a keyboard or mouse-type device).

Figure 2:
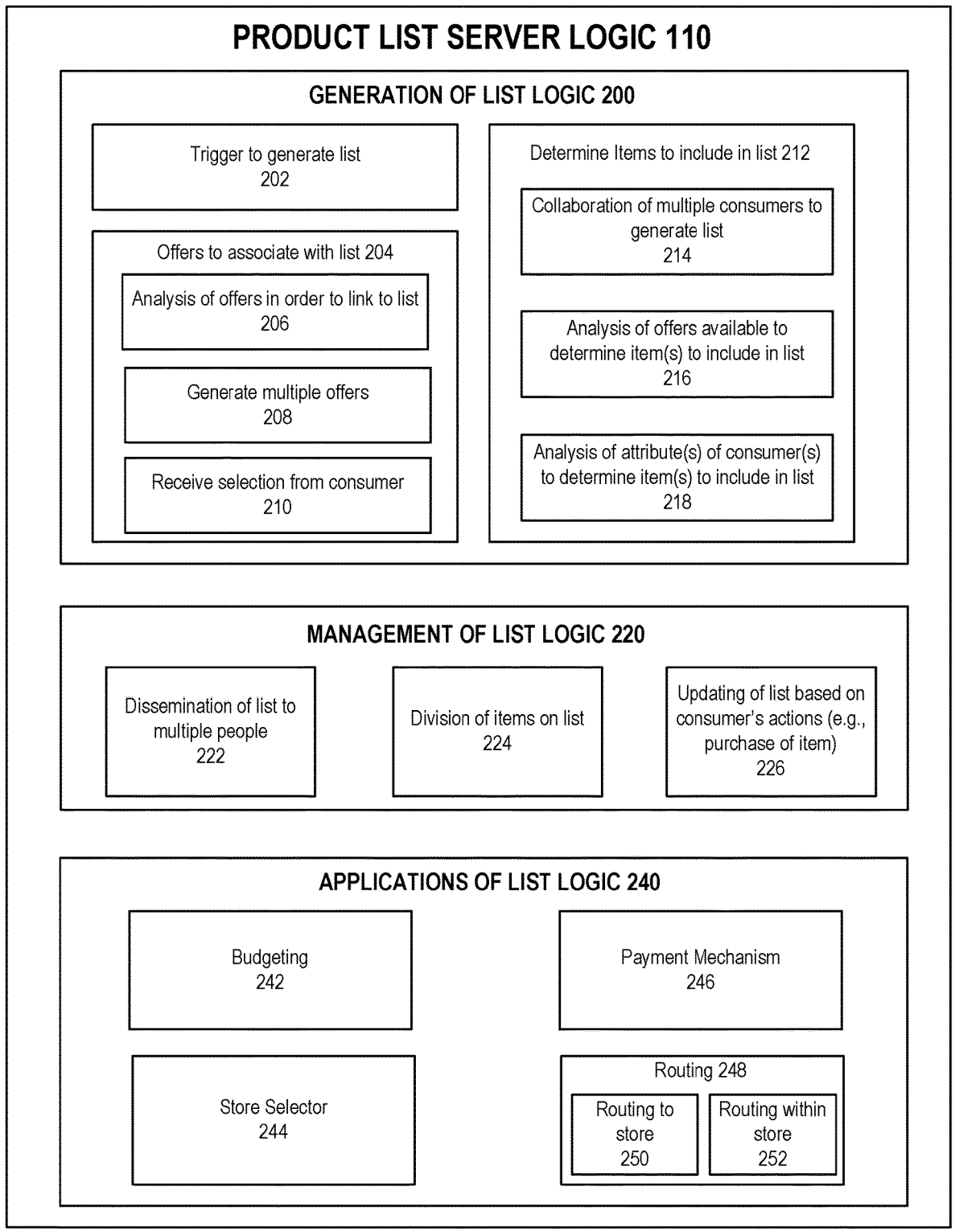
FIG. 2 shows a block diagram of the product list server logic within the product list system of FIG. 1.

FIG. 2 is a block diagram illustrating the product list server logic 110. The product list server logic 110 may comprise one or more programs that, when executed by product list server processor 104, provide the functionality as discussed herein. FIG. 2 illustrates various blocks segmented based on function, such as generation of list logic 200, management of list logic 220, and applications of list logic 240. The segmentation is for illustration purposes only.

Figure 4:
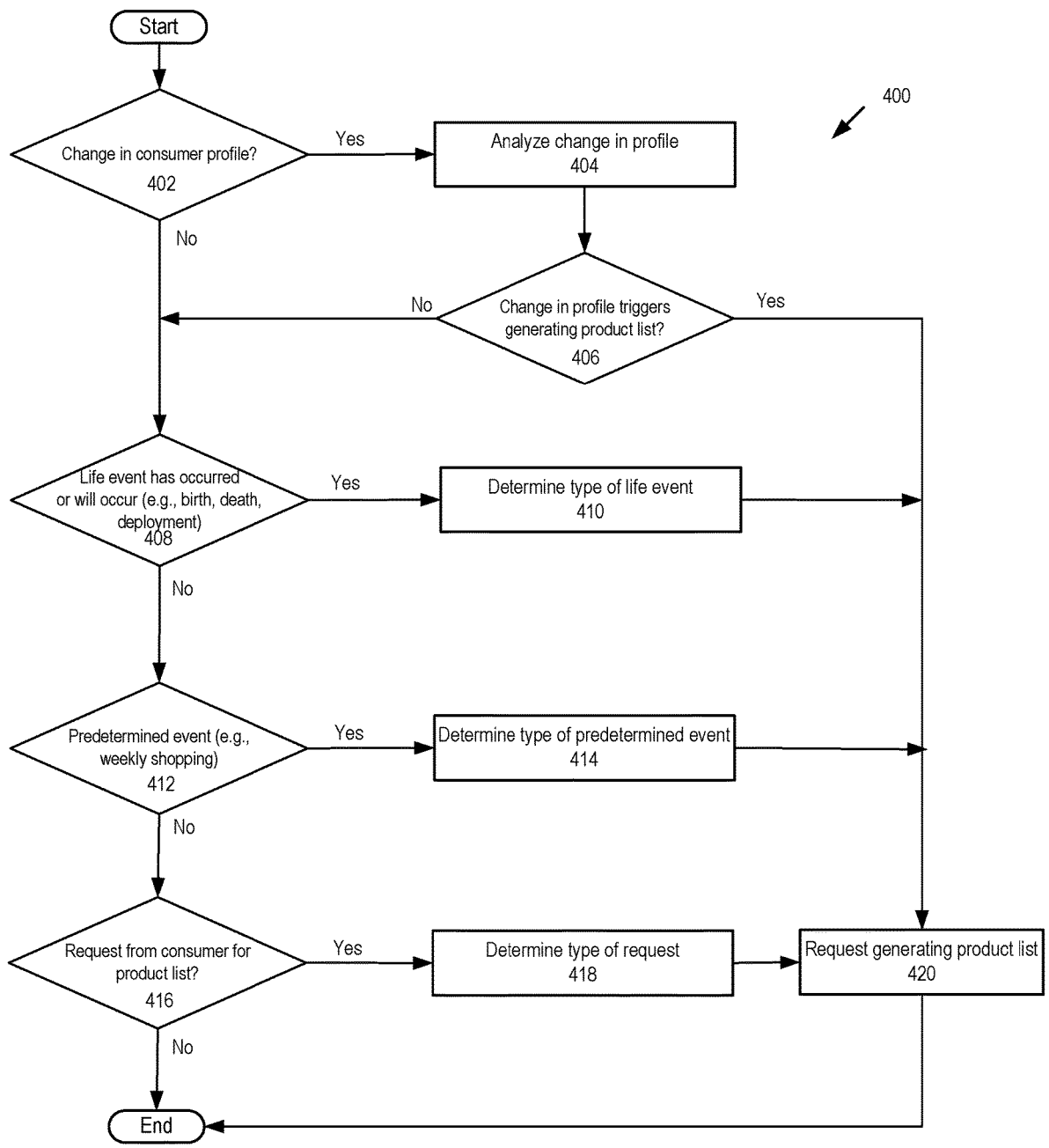
FIG. 4 illustrates one example of a flow diagram to generate a product list based on changes in the consumer profile, life events, predetermined events, and consumer requests.

Generation of list logic 200 includes various functions relating to generating the product list, such as: trigger to generate list logic 202, offers to associate with list logic 204, and determine items to include in list logic 212. For example, the trigger to generate list logic 202 may comprise logic executed by the product list server 104 to analyze one or more triggers for generating a product list. Examples of the triggers are illustrated in FIG. 4.

The offers to associate with the list logic 204 may comprise logic executed by the product list server 104 to analyze offers in the offer database 110. The offer database 110 may be analyzed to determine which offer(s) to link to the product list.

The product list (or individual items on the product list) may spur offers to be linked to or associated with the product list. More specifically, the offer database 110 may be searched for offers that are relevant to the product list. The offers may be associated to the list as a whole (such as a percentage discount on all purchases from the product list), associated to categories of items on the product list (such as a discount for dairy products), or associated with individual items on the product list (such as a discount for the purchase of the individual item). To that end, the offers to associate with the list logic 204 may include analysis of offers in order to link to list logic 206, which may analyze the offers in the offer database 110 in order to determine which offers to link to the list. Generate multiple offers logic 208 may be used to associate multiple offers to the product list for presentation to the consumer. Receive selection from consumer logic 210 may be used, in response to presenting multiple offers to the consumer, to receive a selection from the consumer of one of the multiple offers presented.

Figure 5A:
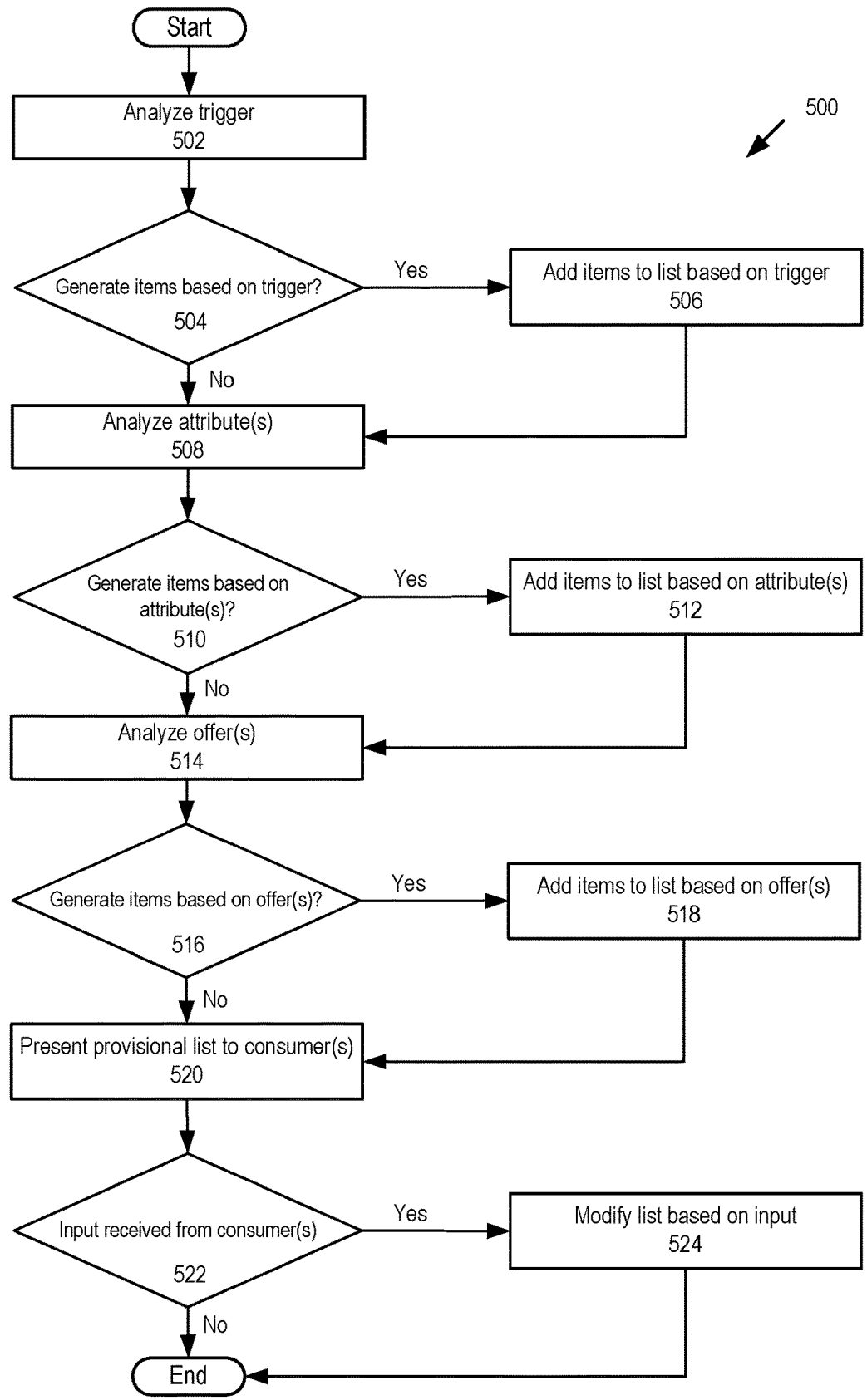
FIG. 5A illustrates an example of a flow diagram to generate a product list based on triggers, consumer attributes, and promotion offers.

The generation of list logic further may include determine items to include in list logic 212, which is discussed in FIG. 5A. The items in the product list may be determined based on one or more sets of logic. For example, collaboration of multiple consumers to generate the list logic 214 comprises logic which, when executed by the product list server 104, enables multiple consumers in a group to input items for compilation into a product list for the group. More specifically, one, some, or all of the multiple consumers in the group may input one or more items. The input may come in one of several forms. As one example, one, some, or all of the multiple consumers may login to the product list server 104 using an ID associated with the group. The input, when using the ID associated with the group, may be used by the product list server 104 as input for the group. As another example, one, some, or all of the multiple consumers may send an electronic communication to the product list server 104 that includes one or more items and the ID. In response to receiving the electronic communication, product list server 104 may compile a list of items associated with the ID.

The product list server 104 may reconcile the list, and publish the list amongst the group. Reconciling the list may comprise removing duplicate items submitted by different consumers in the group. Alternatively, or in addition, reconciling the list may comprise adding items to the product list for the group based on the individual items submitted by different consumers. For example, in the event that one of the consumers in the group submits "Hot Dogs" as an item on the list, the product list server 104 may add "Hot Dog Buns". In this regard, the product list server 104 may supplement the list.

Figure 5B:
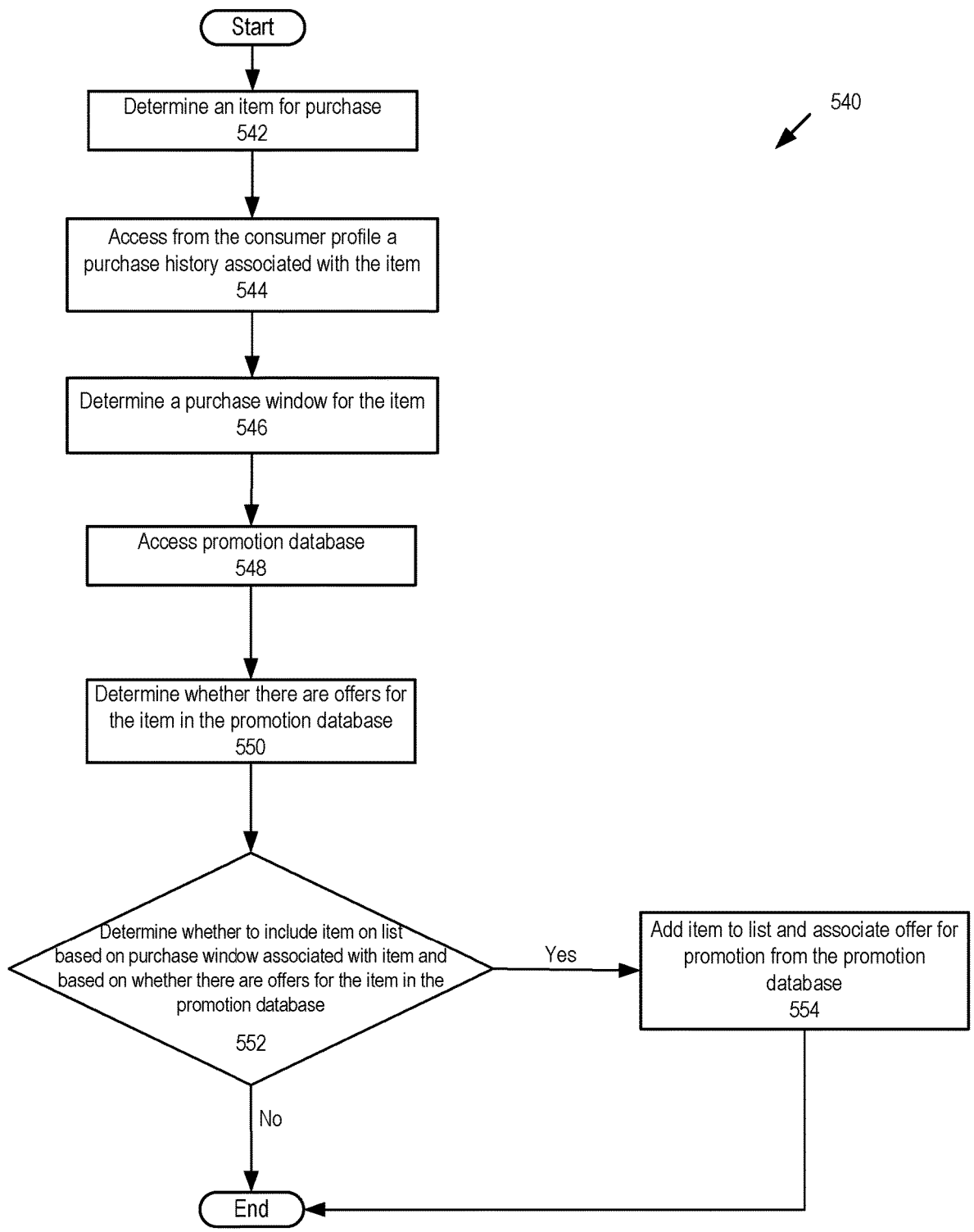
FIG. 5B illustrates another example of a flow diagram to generate a product list based on promotion offers and a purchase window associated with an item.

Analysis of offers to determine item(s) to include in list logic 216 comprises analyzing the offers in the offer database to determine which item(s) to include in the product list, such as illustrated in FIGS. 5A and 5B. Analysis of attribute(s) of consumer(s) to determine item(s) to include in list logic 218 comprises analyzing the attributes of the consumer (or consumers in the context of a group of consumers) to determine items to include in the list, such as illustrated in FIG. 5A.

Figure 7:
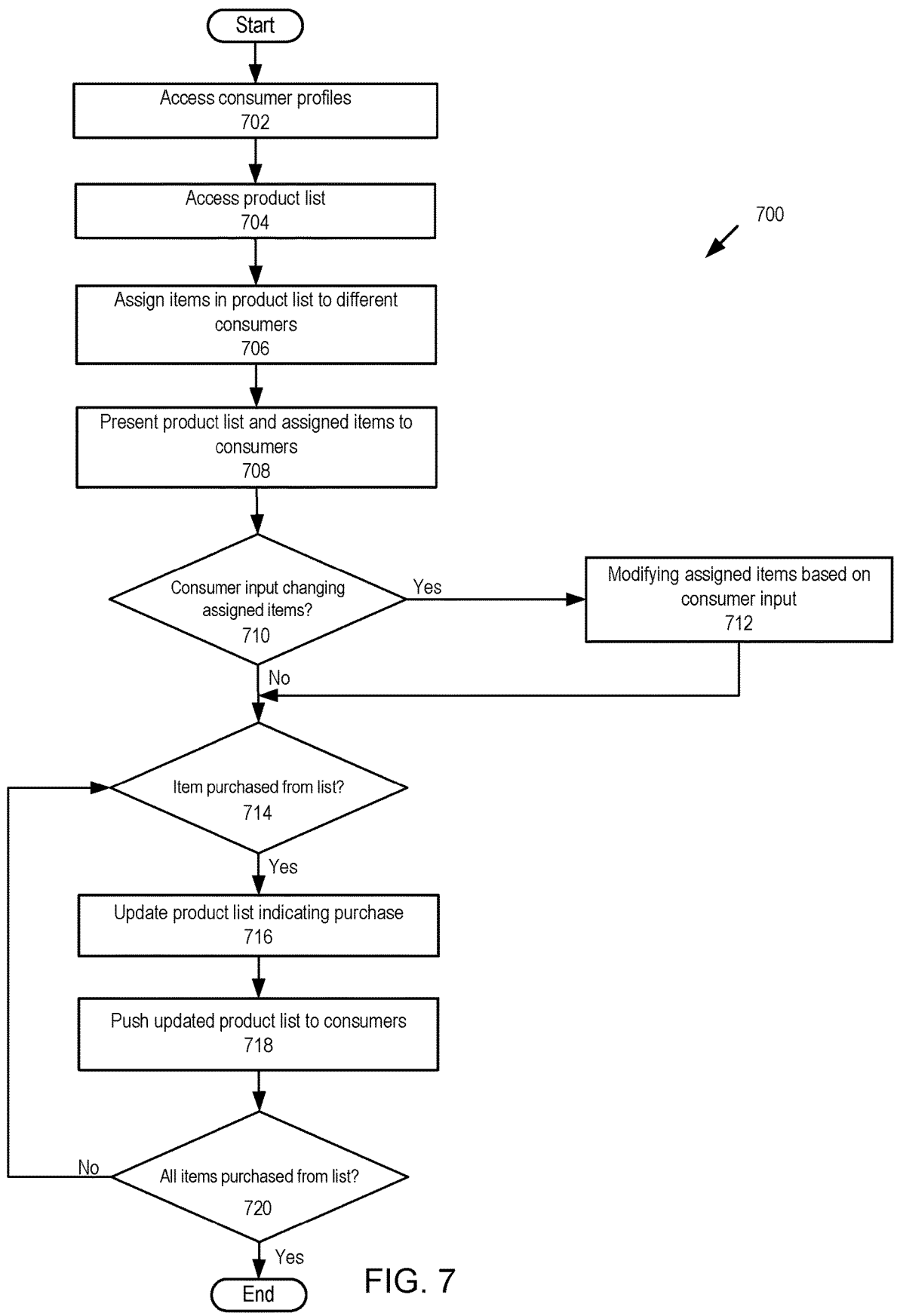
FIG. 7 illustrates a flow diagram for sharing of and collaborating on product lists.

Once the product list is generated, management of list logic 220 may be used to manage the list. Examples of management of list logic 220 include, but are not limited to: dissemination of list to multiple people logic 222 (e.g., in the instance where the product list is associated with a group, disseminating the product list to one, some, or all of the consumers in the group); division of items on the list logic 224 (such as illustrated in FIG. 7); and updating of list based on consumer's actions logic 226 (such as illustrated in FIG. 7).

Figure 6A:
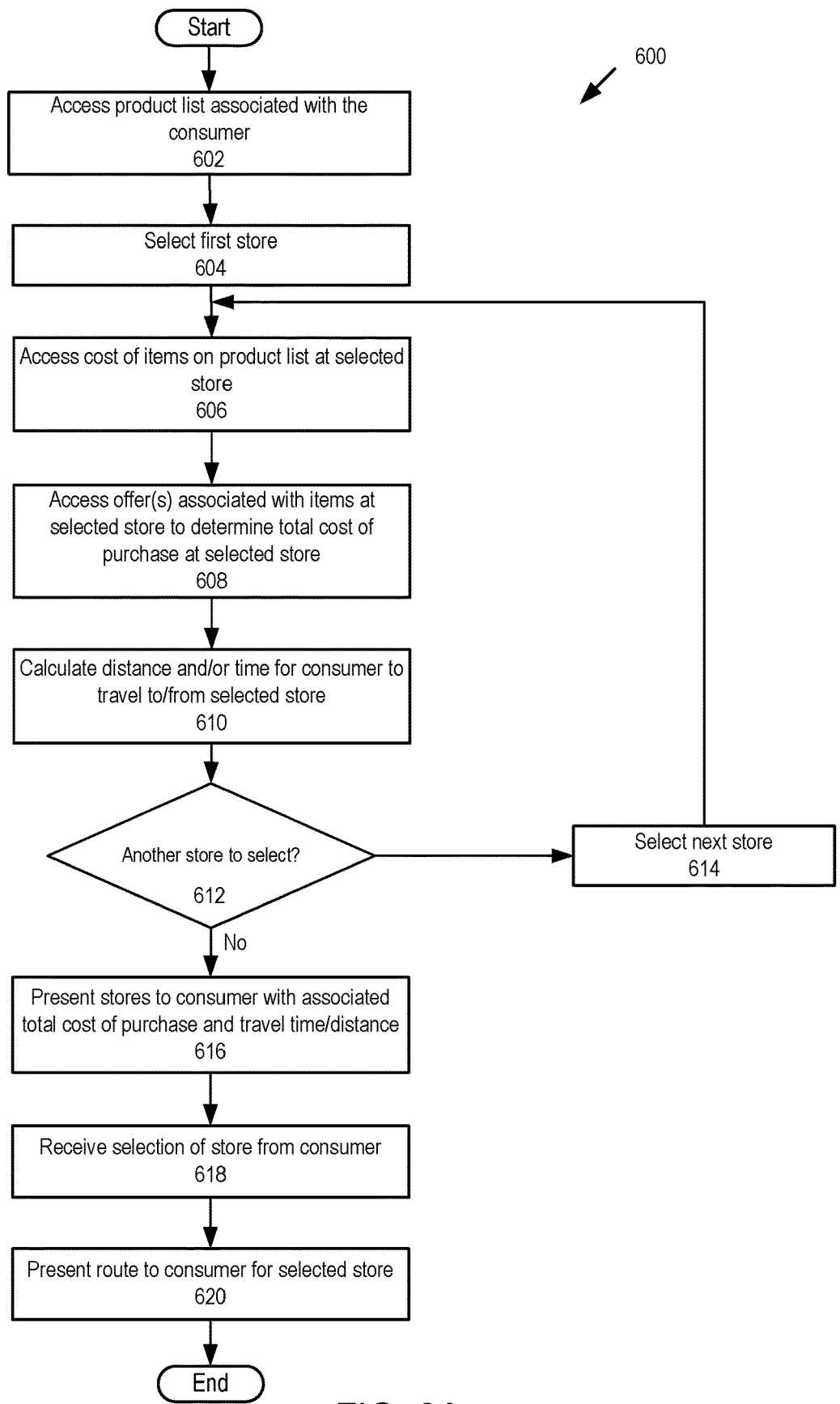
FIG. 6A illustrates a flow diagram for determining the money cost and time cost to travel to different stores.
Figure 6B:
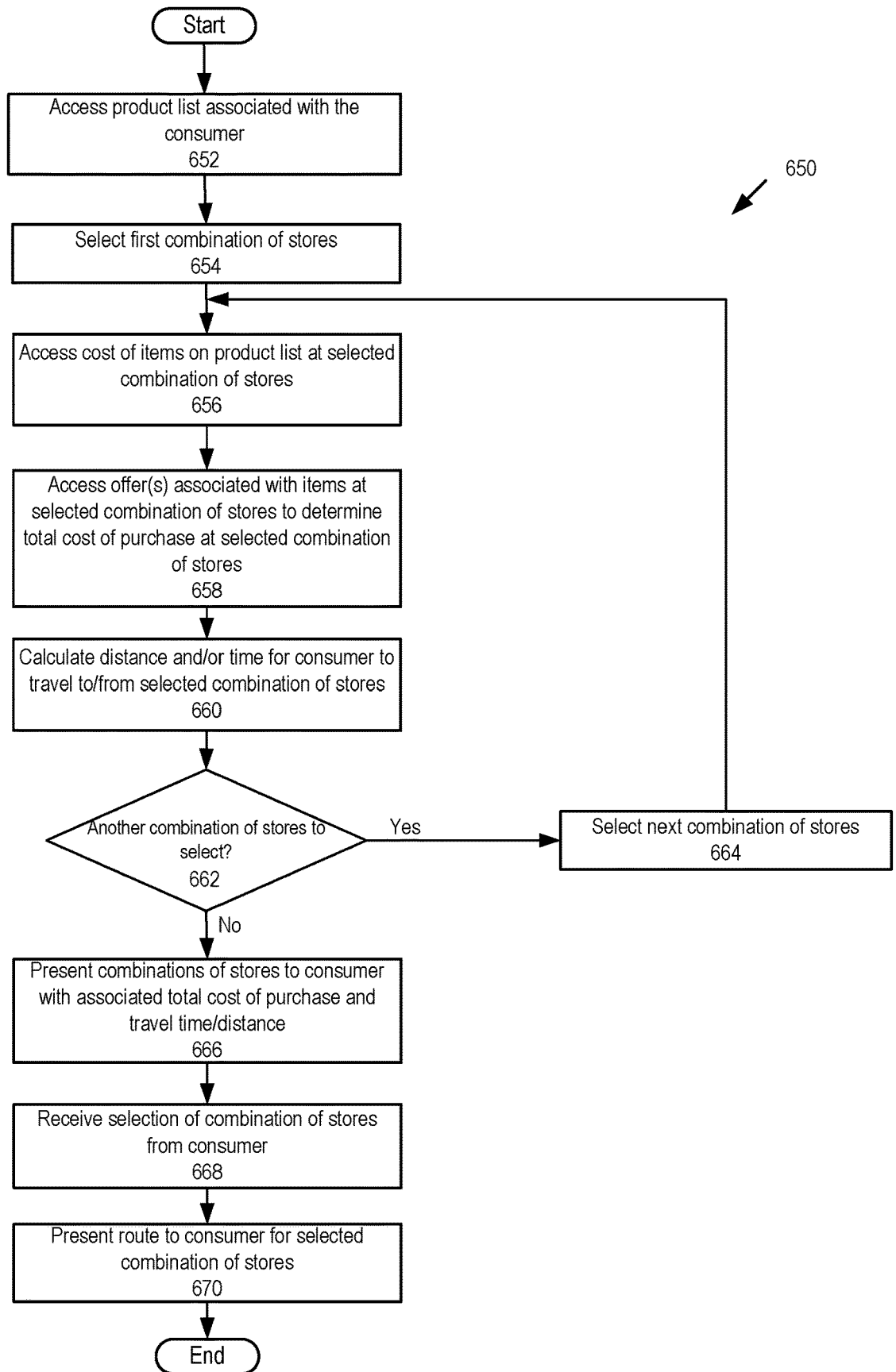
FIG. 6B illustrates a flow diagram for determining the money cost and time cost to travel to different combinations of stores.
Figure 8:
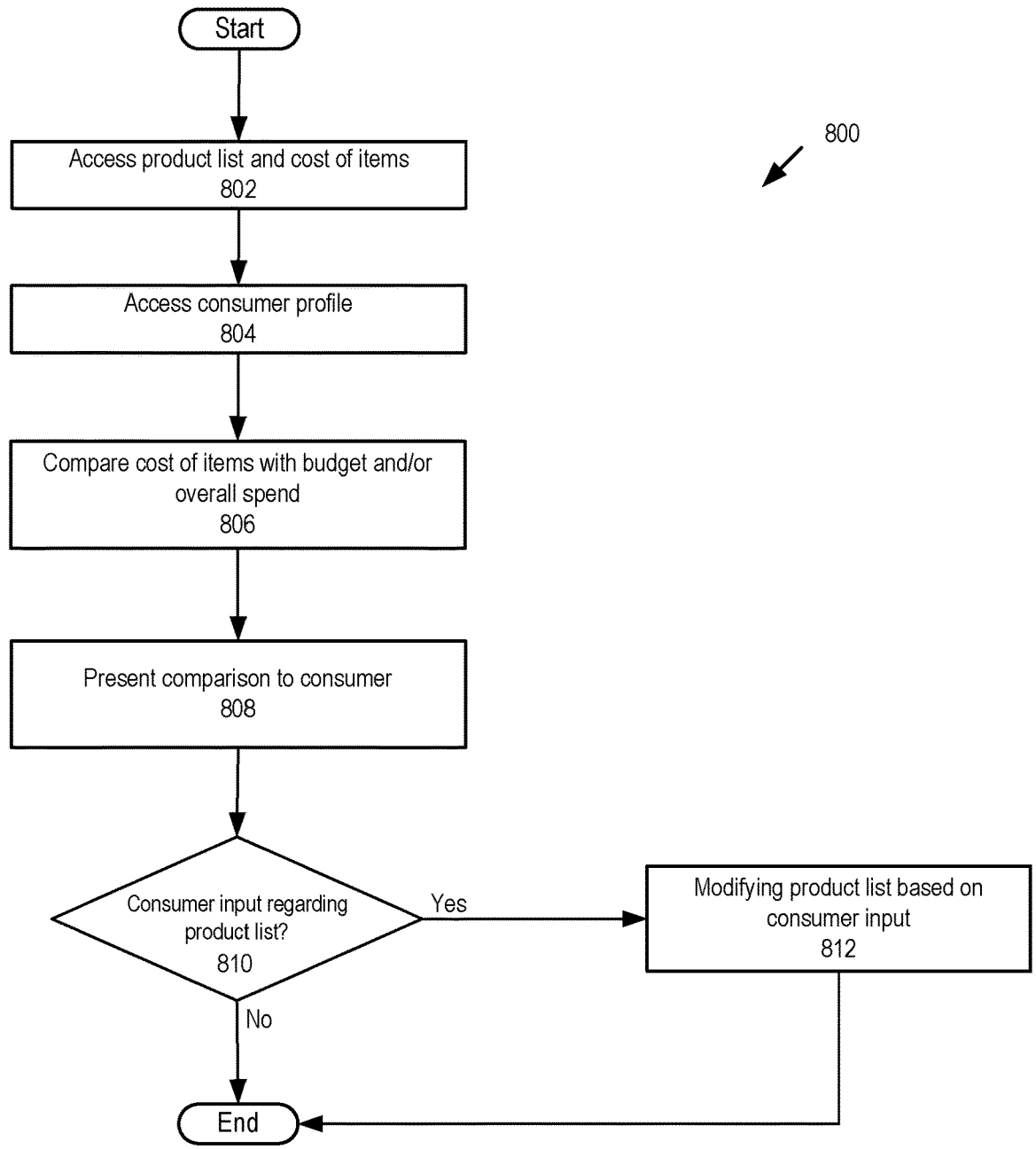
FIG. 8 illustrates a flow diagram for comparing a product list to a budget.
Figure 9:
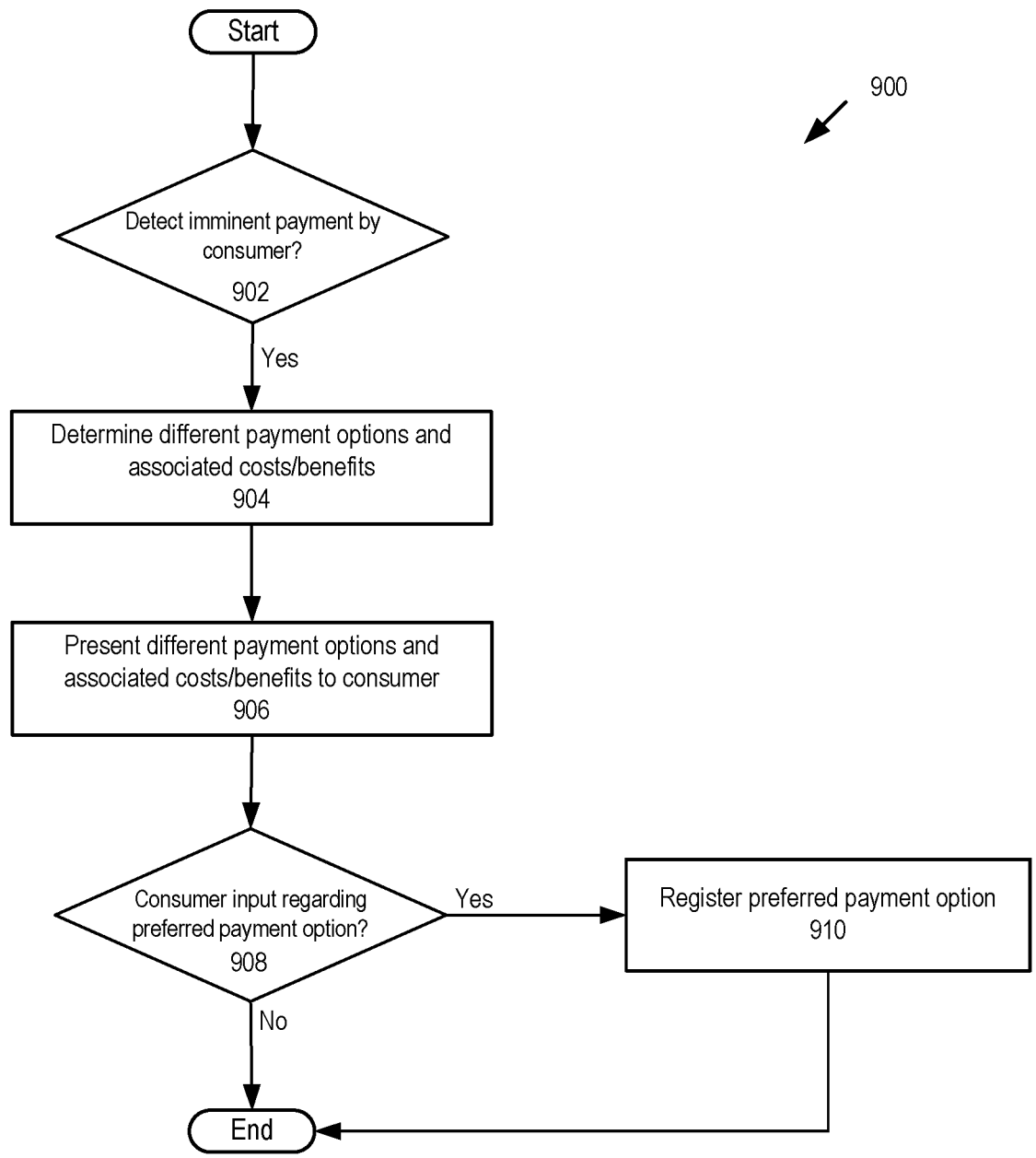
FIG. 9 illustrates a flow diagram for determining different payment methods and associated benefits and/or costs.

Applications of the list logic 240 may be used for application of the product list. Examples of applications of the list logic 240 include, but are not limited to: budgeting logic 242 (such as illustrated in FIG. 8); store selector logic 244 (such as illustrated in FIGS. 6A and 6B); payment mechanism logic 246 (such as illustrated in FIG. 9); and routing logic 248 (such as routing to store logic 250 (e.g., FIG. 10) and routing within store logic 252 (e.g., FIG. 11)).

Figure 3:
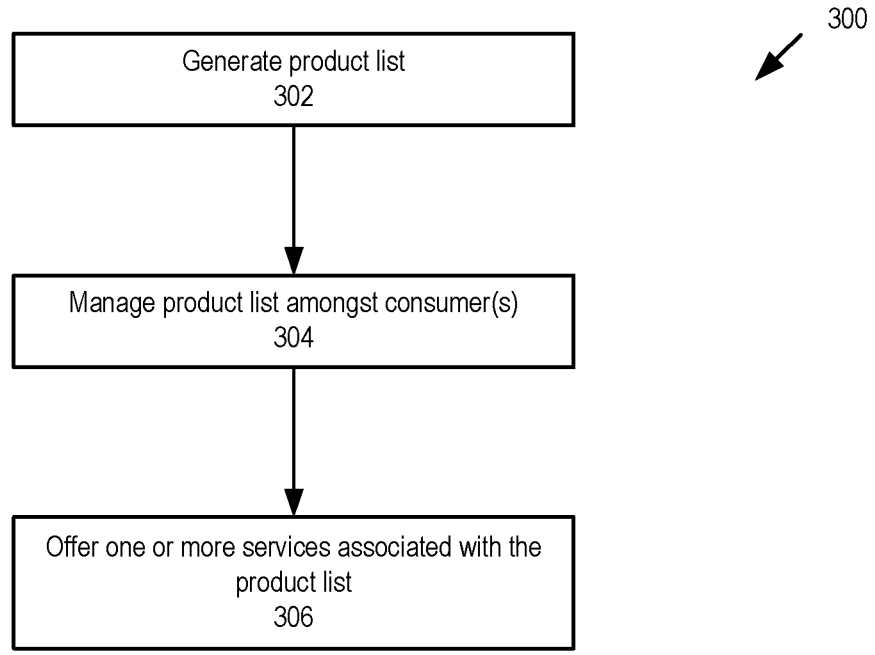
FIG. 3 illustrates a flow diagram to generate and manage a product list.

FIG. 3 illustrates a flow diagram 300 to generate and manage a product list. At 302, a product list is generated. The product list may be generated based on one or more triggers, such as discussed in FIG. 4. Further, items on the product list may be added in one of several ways, such as discussed in FIGS. 5A and 5B. At 304, the product list is managed amongst one or more consumers, such as discussed in FIG. 7. At 306, one or more services associated with the product list are offered. Examples of services include budgeting, store selection, payment mechanism selection, and routing.

FIG. 4 illustrates one example of a flow diagram 400 to generate a product list based on changes in the consumer profile, life events, predetermined events, and consumer requests. As discussed above, one or more triggers may be used in order to prompt generation of the product list. FIG. 4 illustrates a series of triggers. Both the type of triggers as well as the sequence of examining the triggers is merely for illustration purposes. Other triggers and other sequences are contemplated.

At 402, it is determined whether there is a change in the consumer profile. As discussed above, the consumer profile may comprise one or more attributes associated with the consumer. In response to determining a change to the consumer profile, at 404, the change to the consumer profile is analyzed. One example of a change to a consumer profile may comprise the creation of the consumer profile. Another example of a change to a consumer profile may comprise adding a person to the profile. As discussed below, At 406, it is determined, based on the analysis at 404, whether the change in the consumer profile triggers generating a product list. If so, the flow diagram 400 moves to 420.

At 408, it is determined whether a life event will or has occurred. As discussed above, a life event may comprise an event that changes a respective consumer's status or circumstances. Examples of a life event include, but are not limited to, a birth, a marriage, a divorce, a death, a loss of job, a vacation, a graduation, or a military deployment. Determining whether a life event has occurred or will occur may be performed in one of several ways. In a first way, the consumer profile may be examined to determine whether there is an indication of an upcoming life event. As one example, the consumer profile may be examined to determine whether the profile adds a dependent (to indicate a recent birth). In this regard, similar to the analysis at 402 and 404, a change in the consumer profile may indicate a trigger. In response to the determination of a life event at 408, at 410, the type of life event is determined (such as a birth). In a second way, purchases associated with the consumer profile may indicate a life event. For example, a purchase may be directed to an airline ticket. The airline ticket may thus indicate type of life event, such as a vacation or a work trip.

At 412, it is determined whether there is a predetermined event, such as a weekly shopping trip, a back-to-school shopping trip, etc. This determination may be made based on one or more factors including, without limitation: a predetermined interval (such as a weekly shopping trip); and/or analysis of shopping patterns for the consumer to determine the precise time of the predetermined event (e.g., analysis of previous purchases indicate that grocery shopping is performed on Tuesdays). At 414, the type of predetermined event may be determined (such as the weekly grocery shopping trip or the yearly back-to-school shopping trip).

At 416, it is determined whether the consumer has requested a shopping list. The request may be submitted to product list server 104. In response to determining that the consumer has submitted a request, at 418, the type of request is determined in order to request generating the product list at 420.

FIG. 5A illustrates one example of a flow diagram 500 to generate a product list based on triggers, consumer attributes, and promotion offers. As discussed above, items may be added to the product list based on one or more factors. FIG. 5A list some exemplary factors. Other factors are contemplated. Further, FIG. 5A illustrates a sequence of analyzing the factors. Other sequences are contemplated.

At 502, it is determined whether a trigger is present to generate a product list. In response to determining that a trigger is present, at 504, items are added to the product list based on the trigger.

As discussed in FIG. 4, different types of triggers may motivate the generation of a product list. For example, different events (such as life events or predetermined events) and different requests from the consumer may trigger the generation of the product list. Further, different types of event and requests (such as the specific type of life event, the specific type of predetermined event, the specific type of request) may determine the items included in the product list. For example, a birth life event may result in inclusion of a predetermined list of items. More specifically, the birth life event may include the following list of items: infant car seat; crib; changing table; 0-3 month baby clothes; bassinette; etc. Though not illustrated in FIG. 5A, additional information associated with the life event may affect the items included in the product list. In the example of a birth life event, the gender of the baby may affect the items included in the product list (such as pink 0-3 month baby clothes in the instance where the baby is a girl). Alternatively, or in addition, in the example of a birth life event, whether there are other siblings (and the ages of the siblings) may affect the items included in the product list. As one example, determination that the family has an older sibling affects items included or excluded from the product list (such as not including an infant car seat in the instance where the new baby has an older sibling).

As another example of a life event, the product list system may determine that the life event comprises a hunting trip. As discussed above, the product list system may determine a specific life event, such as a hunting trip, based on one or more factors, such as analyzing a profile associated with the consumer. For example, the product list system may determine that the consumer has reserved a cabin, and conclude that the consumer is planning a hunting trip. As another example, the product list system may determine that the consumer schedules a hunting trip at the same time each year. In this regard, the product list system may expect a hunting trip at approximately the same time each year. In response to determining the hunting trip as a life event, the product list system may compile a list of items for the hunting trip. The list of items for the hunting trip may be based on items purchased, from similarly situation consumers, in preparation for a hunting trip and/or based on items purchased from the consumer in preparation for a previous hunting trip. More specifically, the product list system may analyze similarly situated consumers, such as consumers in a similar age range and/or a similar geographic region, and the purchases from those similarly situated consumers when preparing for a hunting trip. Alternatively, or in addition, the product list system may analyze the purchases of the consumer when preparing for previous hunting trips. The list of items may be tailored for a specific geographic region (or a specific location) if the product list system has the specific geographic region (or a specific location) of the hunting trip. For example, the product list system may determine the list of items and suggest a store in the specific location of the hunting trip to purchase some (or all) of the items on the list. More specifically, the perishable items on the list may be separated into a sub-list from the non-perishable items. The product list system may suggest purchase of the non-perishable items at a store near the home of the consumer and may suggest purchase of the perishable items at a store near the specific location of the hunting trip. Alternatively, the product list system may determine whether it is less expensive to purchase the non-perishable items at a store near the home of the consumer or near the location of the hunting trip. In the event that some (or all) of the non-perishable items are cheaper for purchase near the location of the hunting trip, the product list system may include those cheaper items with the perishable items for purchase at a store near the specific location of the hunting trip.

As still another example of a life event, the product list system may determine that the life event comprises a graduation (such as a graduation from high school or college). As discussed above, the product list system may determine a specific life event, such as a graduation, based on one or more factors, such as analyzing a profile associated with the consumer. In response to determining a graduation life event, the product list system may generate a product list associated with the life event. The product list system may analyze any one, or both, of the following: graduation purchases from similarly situated consumers; and previous graduation purchases from the consumer. For example, the product list system may generate a product list based on analyzing similarly situated consumers, such as consumers in a similar age range and/or a similar geographic region, and the purchases from those similarly situated consumers when preparing for a graduation. For non-perishable items in the generated product list, the product list system may analyze previous purchases from the consumer in order to determine whether the consumer has previously purchased these. If so, the non-perishable items previously purchases are removed from the product list.

As yet another example of a life event, the product list system may determine that the life event comprises a vacation. Similar to the hunting trip, the product list system may determine a specific life event, such as a vacation, based on one or more factors, such as analyzing a profile associated with the consumer. For example, the product list system may determine that the consumer has reserved purchased airplane tickets, and conclude that the consumer is planning a vacation. As another example, the product list system may determine that the consumer schedules a vacation at the same time each year. In this regard, the product list system may expect a vacation at approximately the same time each year. In response to determining the vacation as a life event, the product list system may compile a list of items for the vacation. The list of items for the vacation may be based on items purchased, from similarly situation consumers, in preparation for a vacation and/or based on items purchased from the consumer in preparation for a previous vacation. More specifically, the product list system may analyze similarly situated consumers, such as consumers in a similar age range and/or a similar geographic region, and the purchases from those similarly situated consumers when preparing for a vacation (such as in purchasing items to a same or similar location as the vacation of the consumer). Alternatively, or in addition, the product list system may analyze the purchases of the consumer when preparing for previous vacations. The list of items may be tailored for a specific geographic region (or a specific location) if the product list system has the specific geographic region (or a specific location) of the vacation. For example, the product list system may determine the list of items and suggest a store in the specific location of the vacation to purchase some (or all) of the items on the list. More specifically, the perishable items on the list may be separated into a sub-list from the non-perishable items. The product list system may suggest purchase of the non-perishable items at a store near the home of the consumer and may suggest purchase of the perishable items at a store near the specific location of the vacation. Alternatively, the product list system may determine whether it is less expensive to purchase the non-perishable items at a store near the home of the consumer or near the location of the vacation. In the event that some (or all) of the non-perishable items are cheaper for purchase near the location of the vacation, the product list system may include those cheaper items with the perishable items for purchase at a store near the specific location of the vacation.

At 508, attributes of the consumer are analyzed. As discussed above, the consumer may have an associated profile that includes one or more attributes. The consumer attributes may indicate one or more items for inclusion in the product list. At 510, based on the analysis of the attributes, it is determined whether to generate items based on the consumer attributes. In response to determining to generate items based on the consumer attributes, at 512, items are added to the product list based on the consumer attributes.

At 514, one or more offers are analyzed. As discussed above, the offer database 114 may include one or more offers. Analysis of the offer(s) may result in inclusion of one or more items in the product list, examples of which are discussed in FIG. 5B. At 516, based on the analysis of the offer(s), it is determined whether to generate items based on the offer(s) in the offer database 114. In response to determining to generate items based on the offer(s), at 518, items are added to the product list based on the offer(s).

At 520, the provisional product list is presented to one or more consumers. In one embodiment, the provisional product list is presented to a single consumer. In an alternate embodiment, the provisional product list is presented to a group of consumers. The group may be associated with one another, with the product list presented to the group for purchased, as discussed above.

At 522, it is determined whether the consumer(s) submit input. If so, at 524, the product list is modified based on the input. In one example, the input may add, delete, or substitute products from the product list.

FIG. 5B illustrates another example of a flow diagram 540 to generate a product list based on promotion offers and a purchase window associated with an item. As discussed above, an offer for an item, stored in offer database 114, may result in inclusion of the item in the product list.

At 542, an item is determined for purchase. The item under analysis may comprise an item that is purchase infrequently, such as monthly, bi-monthly, or the like. A look-up table may store items that are purchased infrequently, such as paper towels, toilet paper, breakfast cereal, etc.

At 544, the consumer profile is accessed to determine a purchase history associated with the item. As discussed above, the consumer profile may include information regarding past purchases, such as past purchases for the item. In this regard, a window (or other indication of an elapsed time since the last purchase of the item) may be calculated. In the example of paper towels, the consumer profile may access the last time the consumer purchased paper towels (such as 1 month ago).

At 546, a purchase window for the item may be determined. The purchase window may comprise the interval at which the item is purchased. The purchase window of a particular consumer may be determined based on analysis of the purchase history of the particular consumer. In the example of paper towels, the purchase history of the particular consumer may indicate a purchase window of every 2-4 weeks. Alternatively, the purchase window may be determined using a look-up table indicating purchase windows for similarly situated consumers. In the example of paper towels, a look-up table may correlate certain attributes with previously determined purchase windows (such as correlating age range (e.g., 30-39 years old) and income bracket to previously determined purchase window for paper towels).

At 548, the promotion database is accessed. At 550, it is determined whether there are offers in the promotion database for the item. At 552, it is determined whether to include the item in the list of products based on the purchase window of the item and based on the promotion(s) in the promotion database. In response to determining to include the item in the list of products, at 554, the item is added to the product list and the offer is associated with the item on the product list.

For example, one or more weights may be used for the purchase window and the promotion(s) in the promotion database. More specifically, the purchase window may indicate a frequency of purchases of the item. Weights (or adjustment factors) may be used to bias inclusion of the item in the list when one or both of the following occurs: (1) the purchase window indicates that the consumer is due to purchase the item; and/or (2) the promotion associated with the item is sufficiently good. In the instance where the frequency of purchase for the item (an example of the purchase window) is once per month and where the last time the consumer purchased the item was one week ago, an adjustment factor is used to weigh against inclusion of the item on the list. Conversely, where the frequency of purchase for the item is once per month and where the last time the consumer purchased the item was one month ago, an adjustment factor is used to weigh for inclusion of the item on the list. The adjustment factor may, for example, have the amount of time since the last purchase of the item by the consumer in the numerator and the frequency of purchase of the item in the denominator. Similarly, the amount of the promotion for the item may be used as a factor to weigh either for or against inclusion in the list. For example, the amount of the promotion for the item (such as a percentage reduction or a dollar amount reduction for purchase of the item) may be compared with an average discount for the item (as tracked over a period of time, such as over the last year). The comparison may be used as a weight, whereby a greater than average discount weighs in favor of including the item in the list and a lower than average discount weighs against including the item in the list.

FIG. 6A illustrates a flow diagram 600 for determining the money cost and time cost to travel to different stores. At 602, a product list for the consumer is accessed. As discussed above, the product list for the consumer may be generated, such as by examining the profile associated with the consumer. Based on the items included in the product list, based on a database associated with stores and/or based on the profile associated with the consumer, the set of potential stores may be generated. For example, the consumer profile may indicate one or more of the following: (1) a location of the consumer (e.g., a home location, a work location, etc.); and/or (2) stores where past purchases were made. As another example, a database associated with stores may indicate the items that are for purchase at the various stores. The set of stores for consideration may be selected based on one or more of the following criteria: (1) a maximum distance between a potential store and the location of the consumer (e.g., the store location is no more than 10 miles away from the consumer location); (2) the potential store includes all of the items on the product list; and/or (3) the consumer has made a purchase from the potential store within a predetermined period (e.g., within the past year).

Given the set of potential stores, at 604, the product list system may select the first store within the set of potential stores. At 606, the product list system may access cost of purchase of the items on the product list at the selected store. At 608, the offer(s) associated with one, some, or all of the items at the selected store are accessed in order to determine a total cost of purchase of the items on the product list at the selected store. At 610, the distance and/or time to travel to and/or from the selected store is calculated. At 612, it is determined whether there is another store to analyze in the set of potential stores. If so, at 614, the next store is selected at the flow chart 600 loops back to 606.

Once the entire set of potential stores are analyzed, at 616, one, some or all of the stores in the set of potential stores are presented to the consumer. For example, ten stores may be included in the set of potential stores, whereas less than all of the ten stores are presented to the consumer. The selection of the stores to present to the consumer may be based on a ranking of the stores. The ranking may be based on one or both of the following: the cost of purchase of items at the store and/or the cost (e.g., monetary cost and/or time cost) to travel to and/or from the store.

Apart from presenting one, some or all of the stores in the set of potential stores to the consumer, one or more costs associated with the purchase of items on the product list from a respective potential store may be presented to the consumer. The costs may comprise one or both of: the costs of purchase of items at the store or the cost (e.g., monetary cost and/or time cost) to travel to and/or from the store. The costs may be presented in one of several ways. One way is to present an "in-store" cost (indicating the cost to purchase the items in a respective store) and a "travel" cost (indicating the monetary cost and the time cost traveling to and from the respective store). Another way is to present a monetary cost (indicating the cost to purchase the items in a respective store and the monetary cost (such as gasoline cost) to travel to and from the respective store) and a time cost (indicating the amount of time to travel to and/or from the respective store).

At 618, the product list system may receive a selection from the consumer of a store. At 620, the product list system may present the route to the consumer to the selected store.

FIG. 6B illustrates a flow diagram 650 for determining the money cost and time cost to travel to different combinations of stores. In the instance where the product list includes products that are purchased from more than one store, the product list system may analyze different combinations of stores in order to present the different combinations to the consumer for the consumer to select one of the different combinations.

At 652, a product list for the consumer is accessed. Based on the items included in the product list, based on a database associated with stores and/or based on the profile associated with the consumer, the set of different combinations of potential stores may be generated.

Given the set of different combinations of potential stores, at 654, the product list system may select the first combination of stores within the set of different combinations of potential stores. At 656, the product list system may access cost of purchase of the items on the product list at the selected combination of stores. At 658, the offer(s) associated with one, some, or all of the items at the selected combination of stores are accessed in order to determine a total cost of purchase of the items on the product list at the selected combination of stores. At 660, the distance and/or time to travel to and/or from the selected combination of stores is calculated. For example, if a selection combination of stores includes a first store and a second store, the distance to travel may comprise calculating the distance to travel from the consumer's home to the location of the first store, the distance to travel from the location of the first store to the location of the second store, and the distance to travel from the location of the second store the consumer's home. Likewise, the time to travel may comprise calculating the time to travel from the consumer's home to the location of the first store, the time to travel from the location of the first store to the location of the second store, and the time to travel from the location of the second store the consumer's home. At 662, it is determined whether there is another combination of stores to analyze in the set of different combinations of potential stores. If so, at 664, the next combination of stores is selected at the flow chart 650 loops back to 656.

Once the entire set of different combinations of potential stores are analyzed, at 666, one, some or all of the stores in the set of different combinations of potential stores are presented to the consumer. For example, ten combinations of stores may be included in the set of different combinations of potential stores, whereas less than all of the ten combinations of stores are presented to the consumer. The selection of the combinations of stores to present to the consumer may be based on a ranking of the combinations stores. The ranking may be based on one or both of the following: the cost of purchase of items at the combination of stores and/or the cost (e.g., monetary cost and/or time cost) to travel to and/or from the combination of stores.

Apart from presenting one, some or all of the stores in the set of different combinations of potential stores to the consumer, one or more costs associated with the purchase of items on the product list from a respective potential store combination may be presented to the consumer. The costs may comprise one or both of: the costs of purchase of items at the potential store combination or the cost (e.g., monetary cost and/or time cost) to travel to and/or from the potential store combination. The costs may be presented in one of several ways. One way is to present an "in-store" cost (indicating the cost to purchase the items in a respective potential store combination) and a "travel" cost (indicating the monetary cost and the time cost traveling to and from the respective potential store combination). Another way is to present a monetary cost (indicating the cost to purchase the items in a respective potential store combination and the monetary cost (such as gasoline cost) to travel to and from the respective potential store combination) and a time cost (indicating the amount of time to travel to and/or from the respective potential store combination).

At 668, the product list system may receive a selection from the consumer of a potential store combination. At 670, the product list system may present the route to the consumer to the selected store combination.

FIG. 7 illustrates a flow diagram 700 for sharing of and collaborating on product lists. At 702, one or more consumer profiles are accessed. In one embodiment, multiple consumer profiles are accessed. For example, the collaborated product list may be associated with a group of consumers. Some or all of the profiles associated with the group of consumers may be accessed. In an alternate embodiment, a single profile may be accessed. For example, only a single profile associated with one of the group of consumer is accessed.

At 704, a product list is accessed. In one embodiment, the product list system may generate a product list, as discussed above. Alternatively, one, some or all of the group of consumers may input the product list.

In one embodiment, the product list system may first assign items in the product list to different consumers within the group of consumers. For example, at 706, the product list system assigns items in the product list to different consumers within the group of consumers. The assignment of the items in the product list may be based on the profiles associated with one, some or all of the consumers. For example, the product list system may determine which store(s) at which to purchase the item(s) and assign the items based on a respective consumer's home location's proximity to the store. As another example, the product list system may access the consumer's profile in order to determine previous purchases made, and assign items that are the same (or similar) to the previous purchases. Alternatively, or in addition, the assigning of the items in the product list may be based on the cost of items in the list. For example, the product list system may determine cost associated with one, some, or all of the items on the list. The product list system may assign items to different consumers based on cost of the items, such as to assign items so that the different consumers each spend approximately the same amount for his or her respective assigned items.

At 708, the assigned items may then be presented to the group of consumers for the consumers' approval (or reassigning). For example, the product list system may send an email to one, some or all of the consumers in the group of consumers. The email may include a list of the items in the product list and an indicator associated with each item on the list indicating the respective consumer, within the group on consumers, assigned to purchase the item. As another example, the product list system may send a link to one, some or all of the consumers in the group of consumers, with activation of the link resulting in the consumer viewing a webpage with a list of the items in the product list and an indicator associated with each item on the list indicating the respective consumer, within the group on consumers, assigned to purchase the item.

The email (or the webpage) may further include the ability of the consumer to change the assignment of an item to a different consumer. For example, the product list system may send an email to a first consumer, within the group of consumers, that includes the list of items and the assignment of the items to members within the group, including the first consumer. The assignment of the items to the members may be part of a pull-down menu. For example, in the instance where a first consumer, a second consumer and a third consumer are the group of consumers and in which ten items are included in the list of items, the product list system may include a pull-down menu associated with each of the ten items included in the list. The email may display the consumer assigned by the product list system (e.g., if item #1 is assigned to the first consumer, the pull-down menu associated with item #1 lists the first consumer). In the event that the first consumer wishes to reassign the purchase of item #1 to another consumer within the group (such as consumer #2), consumer #1 may activate the pull-down menu associated with item #1 to change the assignment from consumer #1 to consumer #2, and send the email back to the product list system. In this regard, the consumers in the group of consumers may either accept or reject the product list system's assignment of purchase of the items.

At 710, it is determined whether consumer(s) in the group of consumers has sent input changing assigned items. As discussed above, the consumer may change the assignment of one, some, or all of the items. Alternatively, the consumer may send back to the product list system an acceptance of all of the assignments by the product list system. In response to determining that the consumer has sent input changing the assigned items, at 712, the product list system modifies the assigned items based on the consumer input.

In an alternate embodiment, the product list system does not provide an initial assignment of the items. Rather, the product list system provides the list to one, some, or all of the consumers in the group of consumers and requests input. In the example above of a group of consumers including a first consumer, a second consumer and a third consumer and ten items included in the list of items, the product list system may include a pull-down menu associated with each of the ten items included in the list. The product list system does not "pre-load" the pull-down menu with its assignments. Rather, the product list system solicits input for the consumer(s) from the group to assign the items to different consumers.

At 714, it is determined whether an item has been purchased from the list. The product list system may monitor purchases of one, some, or all of the consumers in the group of consumers. Monitoring may be performed at the purchase site (such as via an agreement with a retailer), or may be performed at another point in the purchasing/payment process. In response to the product list system identifying a purchase of an item from the product list by a specific consumer within the group of consumers, the product list system may optionally contact the specific consumer to ask the specific consumer if the purchase was for the group.

In response to identifying an item purchased form the list, at 716, the product list system may update the product list indicating the purchase, and at 718, push the updated product list to the consumers in the group of consumers. The updated product list may indicate the purchase of a product from the list (such as by striking through the item from the product list). At 720, the product list system may determine if all items on the product list have been purchased. If not, the flow chart 700 loops back to 714.

FIG. 8 illustrates a flow diagram 800 for comparing a product list to a budget. As discussed above, the product list may be used for various purposes, such as budgeting. At 802, the product list and the cost of the items in the product list are accessed. At 804, the consumer profile is accessed. At 806, the cost of the items in the product list are compared with a budget and/or an overall estimated spend for the consumer. As discussed previously, the consumer may set a budget for any time period and/or any set of purchases. For example, the consumer may set a budget for a weekly grocery budget, a monthly grocery budget, or the like.

At 808, the comparison may be presented to the consumer. The comparison may indicate whether the cost of the items is less than or greater than the budget or the estimated spend. Further, the comparison may indicate a cost associate with one, some, or each of the items in the product list.

In response to presenting the comparison, at 810, the product list system may determine if the consumer has provided input regarding the product list. In response to determining that the consumer has provided input, at 812, the product list is modified based on the consumer input.

For example, the consumer may reduce the number of items on the product list (or indicate a lower cost item within the product list) in order to reduce the cost. More specifically, the consumer may select an alternate item, or may select an alternate brand of an item. In particular, the customer may be presented with an item, and the cost of the item. The item may be a specifically branded item (such as Kelloggs Mini Wheats®) and a cost associated with the specifically branded item. Along with the item, a "change item" icon and/or a "substitute item" icon may be displayed. The "change item" icon may provide the consumer with a manner in which to change the item in the product list. For example, the consumer may change the item from "breakfast cereal" to "oatmeal". The "substitute item" icon may provide the consumer with a manner in which to substitute an item. In the example of Kelloggs Mini Wheats®, the consumer's selection of the "substitute item" instructs the product list system to provide one, or a list, of substitute items and associated costs. More specifically, in response to receiving the "substitute item" request, the product list system may provide the following listing: Post Shredded Wheat Spoon Size® and the associated cost of purchase. In response to being presented with the substitute item, the consumer may select the substitute item, resulting in replacement of the item with the substitute item.

FIG. 9 illustrates a flow diagram 900 for determining different payment methods and associated benefits and/or costs. As discussed above, different payment methods may have associated benefits and costs. At 902, the product list system may determine an imminent payment by the consumer.

Determining an imminent payment may be at one, or multiple stages of the shopping process, such as traveling to the store, entry into the store, selecting items for purchase within the store, waiting in the checkout line, during ringing of purchases by the cashier, and/or when requested by the cashier for a method of payment. For example, an app may be executed on a smartphone of a consumer. The app on the smartphone may receive a product list from the product list system and may also monitor the location of the consumer within the store. At a predetermined stage, such as at checkout, the product list system (monitoring via the app) may send a communication to the consumer as to the various payment options, as discussed below.

In response to detecting an imminent payment by the consumer, at 904, the product list system may determine different payment options and associated costs and/or benefits. The different payment options may be determined based on one or more factors including: (1) the profile associated with the consumer; and/or (2) the store at which the purchase is made. The consumer profile may indicate the various payment mechanisms used previously by the consumer, such as credit card(s), debit card(s), and the like. Further, the store may indicate one or more payment mechanisms allowed (such as cash or credit card, but not check). For example, a specific store may allow payment by Visa® credit cards but disallow payment by American Express® credit cards. In this regard, the product list system may compile the list of available payment options by accessing the payment options used by the consumer and removing payment options disallowed by the store. The product list system may further compile the costs and/or benefits associated with one, some or each of the payment options.

Costs may comprise costs associated with interest charges associated with the payment mechanism, use charges associated with the payment mechanism, or the like. For example, the product list system may calculate the interest charges associated with payment by credit card by analyzing an average time of payment of a consumer when paying credit card charges and in turn the associated interest charges. In this regard, the product list system may provide an actual cost associated with payment by a specific payment mechanism, such as a credit card, based on repayment habits of the consumer. Likewise, the product list system may compile the benefits associated with a payment mechanism.

At 906, the different payment options and associated costs and/or benefits may be presented to the consumer. For example, the app running on the consumer's smartphone may be used to present the different payment options. Optionally, the presentation of the different payment options may be based on analysis by the product list system. For example, the product list system may rank the available payment options and may recommend one (or more than one) payment option to the consumer. The recommendation may be based on the payment habits of the consumer, may be based on predefined goals of the consumer, and/or may be based on the costs/benefits associated with the payment options.

At 908, it is determined whether the consumer has provided input as to the preferred payment option. In one embodiment, the determination may be based on input from the consumer to the app running on the consumer's smartphone. Alternatively, the product list system may access a database associated with the store and/or a database associated with one or more credit card companies in order to determine the preferred payment option of the consumer. In response to determining the preferred payment option, at 910, the preferred payment option is registered. In this regard, the registered preferred payment option may be used for future recommendations of payment options.

Figure 10:
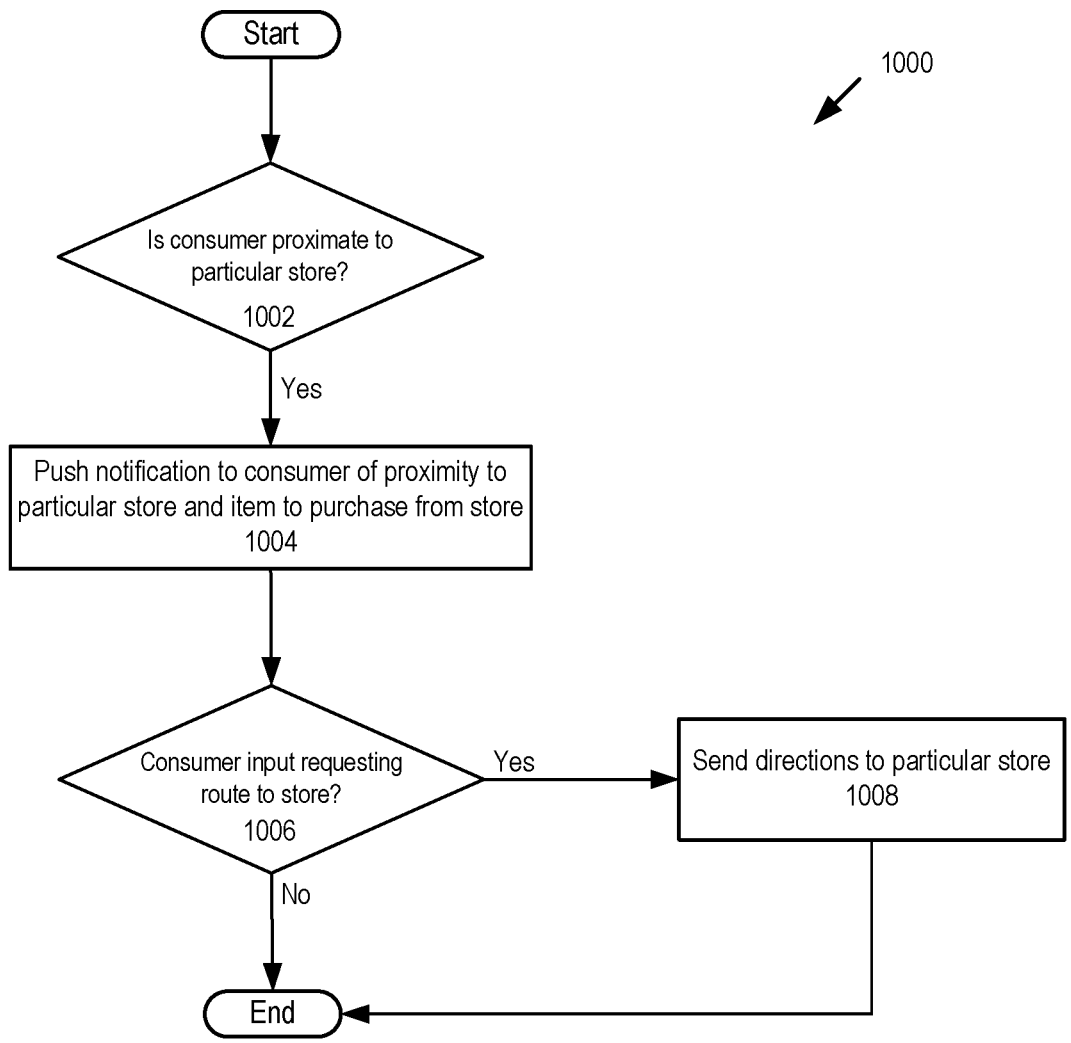
FIG. 10 illustrates a flow diagram for pushing a notification to a consumer of proximity to a store.

FIG. 10 illustrates a flow diagram 1000 for pushing a notification to a consumer of proximity to a particular store. As discussed above, there may be instances where a consumer is notified of proximity to a particular store. The notification may be based on one or more factors, such as: an specific product that the particular store is selling; a specific promotion that the store is offering for the specific product; or a specific price at which the particular store is selling the specific product.

For example, the consumer may indicate that the consumer wishes to receive a notification if the consumer is within 1 mile of a gas station that is selling gas less than or equal to $3.50/gallon. In this regard, the product list system may monitor the location of the consumer, and may check for gas stations that are within a predetermined distance of the GPS coordinates. In the event that the consumer is within 1 mile of a gas station that is selling gas less than or equal to $3.50/gallon, the product list system is configured to notify the consumer via the smartphone. As another example, the product list system may review the previous purchases of the consumer to determine that the consumer purchases low-fat milk when the cost is less than $2.00/gallon. In response to this determination, the product list system may monitor the location of the consumer, and may check for grocery stores that are within a predetermined distance of the GPS coordinates. In the event that the consumer is within 1 mile of a grocery store that is selling milk for less than $2.00/gallon, the product list system is configured to notify the consumer via the smartphone. As still another example, the consumer may indicate an interest in purchasing a certain brand of cereal for less than a predetermined amount. The product list system may search a promotions database to determine whether there are any stores that currently offer the certain brand of cereal for less than a predetermined amount. In response to the product list system determining a particular store that currently offer the certain brand of cereal for less than a predetermined amount, the product list system may configure geo-fences around one, some, or each location of the particular store so that the consumer receives a notification in the event that the consumer is within one of the geo-fences.

At 1002, it is determined whether the consumer is proximate to the store. Proximity to the store may be defined based on distance (such as ½ mile) from the store and/or may be defined based on time to travel to the store. The distance and/or time from the store may be based on input from the consumer (e.g., the consumer inputs to the product list system that if the consumer is ½ mile from a store, the product list system is to send a notification to the consumer). Alternatively, or in addition, the distance and/or time from the store may be based on a distance or time as defined by the product list system. Though not shown in FIG. 10, other criteria (in addition to proximity) may be used to determine whether to notify the consumer. The other criteria may include, without limitation, a price at which the product is being sold (e.g., less than $3.50/gallon of gas, less than $2.00/gallon of milk, etc.).

In response to determining that the consumer is proximate to the store (and optionally other criteria), at 1004, a notification is pushed to the consumer. The notification may indicate one or more of the following: (1) location of the particular store; (2) distance to the particular store; and (3) cost of the item for purchase.

At 1006, it is determined whether the customer has provided input (such as input requesting directions to the particular store). In response to the input, at 1008, the direction to the particular store are sent to the consumer.

Figure 11:
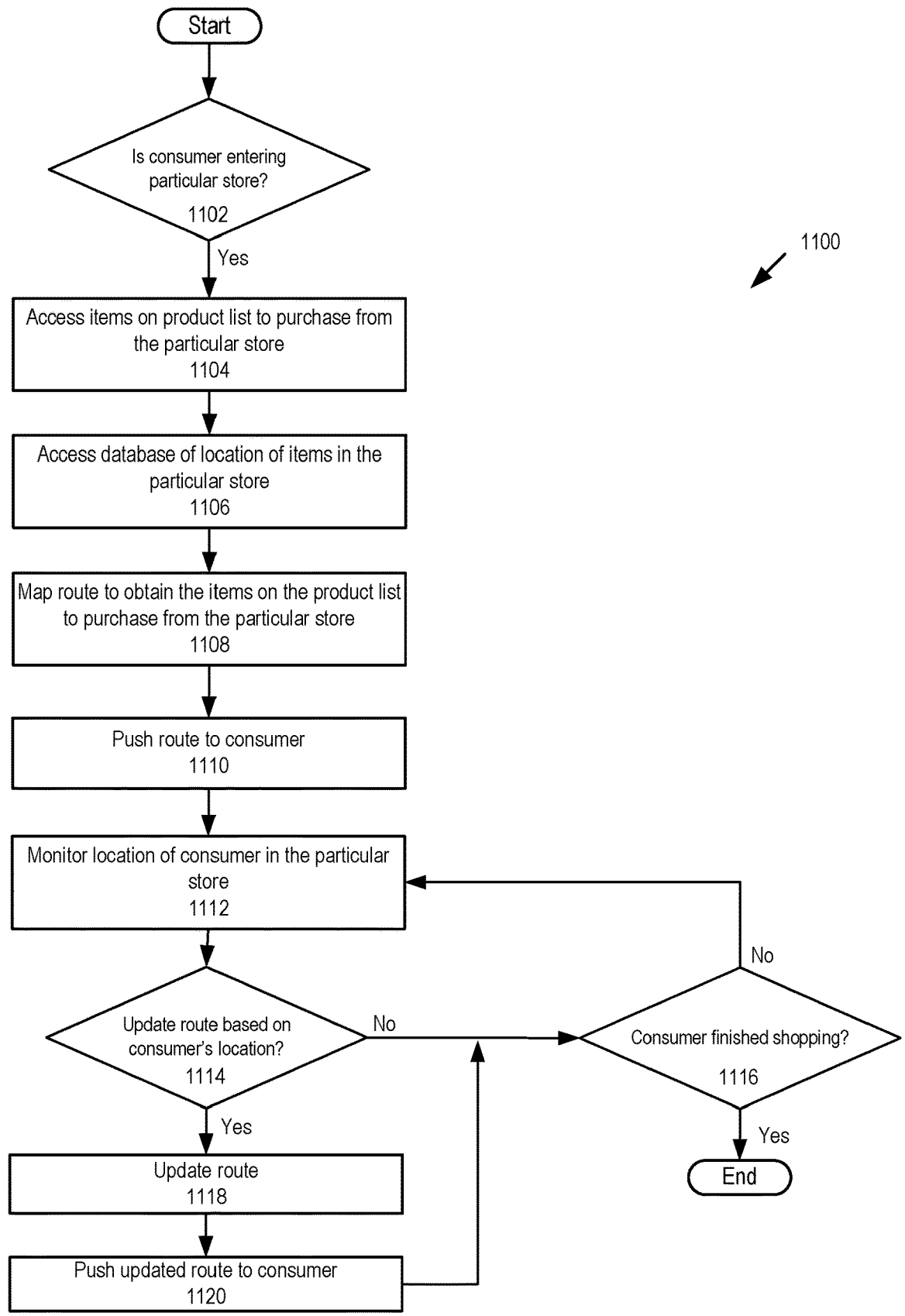
FIG. 11 illustrates a flow diagram for providing to the consumer maps both to and within the store.

FIG. 11 illustrates a flow diagram 1100 for providing to the consumer maps both to and within the store. As discussed above, the product list system may provide directions to a particular store. Optionally, in addition to (or instead of), the product list system may provide directions within the particular store. At 1102, it is determined whether the consumer is entering the particular store. The determination may be made based on GPS coordinates from the consumer's smartphone. At 1104, items on the product list to purchase from the particular store are accessed. Further, a database of location(s) of items in the particular store are accessed. At 1108, the route to obtain the items in the product list is mapped for the particular store. At 1110, the route is pushed to the consumer. As shown in FIG. 11, the route is determined in response to the consumer being proximate to the particular store. Alternatively, the route within the store may be determined at a different time, such as in response to finalizing the list of products for purchase from the particular store.

As discussed above, the in-store directions may take one of several forms. In one example, the in-store directions may comprise a map of the layout of the store with "X"s (or other designation) to indicate the location of an item within the store. More specifically, the map of the layout of the store may include designations for the aisles of the store with an "X" indicating the point in the aisle at which the item is displayed. In addition to the "X" (or other designation), other information may be presented on the map of the layout including, without limitation, any one or combination of the following: the title of the item; the cost of the item; substitute items available (and associated prices); and promotions for the item (including coupons).

In another example, the in-store directions may comprise text or audio directions. The text or audio directions may list the directions item-by-item within the store. In the example of the first item being a jar of peanut butter, the directions may include the following: process to aisle 12 to the middle of the aisle, bottom shelf, in order to obtain the peanut butter jar. Similar to the example above, additional information may be included. The product list system may monitor the location of the consumer within the store in order to dynamically send directions to the consumer. For example, the text/audio may be sent to the consumer based on the consumer's location within the store. More specifically, the product list system may monitor the location of the consumer within the store in order to determine when to send the text/audio. In illustration, the product list system may send directions to the first item to the consumer's portable electronic device, monitor the consumer's location for arrival at the first item, and after determining that the consumer is at the first item, send the directions to the second item to the consumer's portable electronic device. This procedure may be followed until all items on the product list are obtained.

At 1112, the location of the consumer is monitored within the particular store. Based on the location of the consumer, at 1114, it is determined whether to update the route. For example, the route may be dynamically updated to indicate the updated location of the consumer within the store. In the example discussed above, the consumer may be represented within the route as an icon, with the icon moving within the route in order to indicate whether the consumer is along the route.

If it is determined that the route does not need updating, at 1116, it is determined whether the consumer is finished shopping. If not, the flow chart 1100 loops back to 1112. If it is determined that the route needs updating, at 1118, the route is updated and at 1120, the updated route is pushed to the consumer.

Figure 12:
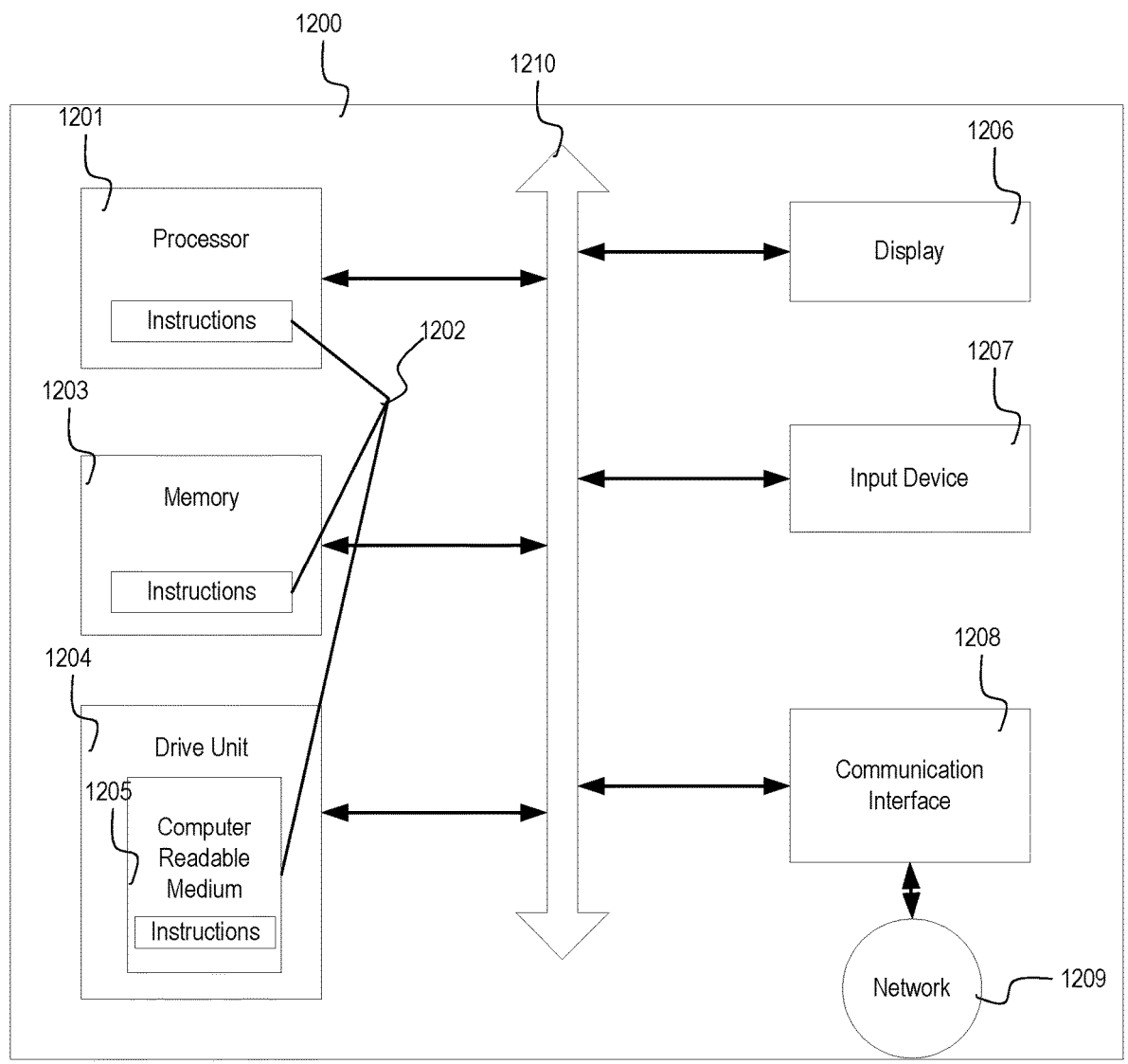
FIG. 12 is a general computer system, programmable to be a specific computer system, which may represent any of the computing devices referenced herein, such as the reward system for implementing the member value accounts.

FIG. 12 illustrates a general computer system 1200, programmable to be a specific computer system 1200, which may represent any server, computer or component, such as Merchant 1 (116), Merchant M (118), Consumer 1 (122), Consumer N (124), product list system 102, or any subcomponent of product list system 102, such as product list server 104. The computer system 1200 may include an ordered listing of a set of instructions 1202 that may be executed to cause the computer system 1200 to perform any one or more of the methods or computer-based functions disclosed herein. The computer system 1200 may operate as a standalone device or may be connected, e.g., using the network 120, to other computer systems or peripheral devices.

In a networked deployment, the computer system 1200 may operate in the capacity of a server or as a client-user computer in a server-client user network environment, or as a peer computer system in a peer-to-peer (or distributed) network environment. The computer system 1200 may also be implemented as or incorporated into various devices, such as a personal computer or a mobile computing device capable of executing a set of instructions 1202 that specify actions to be taken by that machine, including and not limited to, accessing the Internet or Web through any form of browser. Further, each of the systems described may include any collection of sub-systems that individually or jointly execute a set, or multiple sets, of instructions to perform one or more computer functions. As discussed above, the instructions may be manifested in logic, such as product list server logic 110.

The computer system 1200 may include a memory 1204 on a bus 1220 for communicating information. Code operable to cause the computer system to perform any of the acts or operations described herein may be stored in the memory 1204. The memory 1204 may be a random-access memory, read-only memory, programmable memory, hard disk drive or any other type of volatile or non-volatile memory or storage device.

The computer system 1200 may include a processor 1208, such as a central processing unit (CPU) and/or a graphics processing unit (GPU). The processor 1208 may include one or more general processors, digital signal processors, application specific integrated circuits, field programmable gate arrays, digital circuits, optical circuits, analog circuits, combinations thereof, or other now known or later-developed devices for analyzing and processing data. The processor 1208 may implement the set of instructions 1202 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing.

The computer system 1200 may also include a disk or optical drive unit 1215. The disk drive unit 1215 may include a computer-readable medium 1240 in which one or more sets of instructions 1202, e.g., software, can be embedded. Further, the instructions 1202 may perform one or more of the operations as described herein. The instructions 1202 may reside completely, or at least partially, within the memory 1204 and/or within the processor 1208 during execution by the computer system 1200. Accordingly, the databases, such as offer database 110, consumer profile database 112, and routing database 114, may be stored in the memory 1204 and/or the disk unit 1215.

The memory 1204 and the processor 1208 also may include computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 1200 may include an input device 1225, such as a keyboard or mouse, configured for a user to interact with any of the components of system 1200. It may further include a display 1270, such as a liquid crystal display (LCD), a cathode ray tube (CRT), or any other display suitable for conveying information. The display 1270 may act as an interface for the user to see the functioning of the processor 1208, or specifically as an interface with the software stored in the memory 1204 or the drive unit 1215. As discussed above, the consumer-controlled device may include a display and an input device, such as input device 1225.

The computer system 1200 may include a communication interface 1236 that enables communications via the communications network 120. The network 120 may include wired networks, wireless networks, or combinations thereof. The communication interface 1236 network may enable communications via any number of communication standards, such as 802.11, 802.17, 802.20, WiMax, 802.15.4, cellular telephone standards, or other communication standards, as discussed above. Just because one of these standards is listed does not mean any one is preferred as any number of these standards may never actually be adopted in a commercial product.

Block diagrams of different aspects of the system, including FIGS. 1-2 may be implemented using the computer functionality disclosed in FIG. 12. Further, the flow diagrams illustrated in FIGS. 3-11 may use computer readable instructions that are executed by one or more processors in order to implement the functionality disclosed. Finally, the displays may be output on an I/O device.

The present disclosure contemplates a computer-readable medium that includes instructions or receives and executes instructions responsive to a propagated signal, so that a device connected to a network may communicate voice, video, audio, images or any other data over the network. Further, the instructions may be transmitted or received over the network via a communication interface. The communication interface may be a part of the processor or may be a separate component. The communication interface may be created in software or may be a physical connection in hardware. The communication interface may be configured to connect with a network, external media, the display, or any other components in system, or combinations thereof. The connection with the network may be a physical connection, such as a wired Ethernet connection or may be established wirelessly as discussed below. In the case of a service provider server, the service provider server may communicate with users through the communication interface.

The computer-readable medium may be a single medium, or the computer-readable medium may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium may include a solid-state memory such as a memory card or other package that houses one or more non-volatile read-only memories. The computer-readable medium also may be a random access memory or other volatile re-writable memory.

Additionally, the computer-readable medium may include a magneto-optical or optical medium, such as a disk or tapes or other storage device to capture carrier wave signals such as a signal communicated over a transmission medium. A digital file attachment to an email or other self-contained information archive or set of archives may be considered a distribution medium that may be a tangible storage medium. The computer-readable medium is preferably a tangible and non-transitory storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed:

1. A method for determining whether to include an item in a group shopping list, the method comprising:
   accessing a consumer profile for a consumer;
   determining an item for purchase by the consumer based on a specific life event associated with the consumer;
   accessing from the consumer profile a purchase window associated with purchasing the item;
   determining, based on the purchase window and previous purchases by the consumer, whether the consumer is scheduled to purchase the item;
   in response to determining that the consumer is scheduled to purchase the item, including the item in a group shopping list associated with a plurality of consumers that comprises the consumer;
   receiving a sequence of global positioning system (GPS) coordinates from an electronic device associated with the consumer;
   selecting a geographic distance based on the sequence of GPS coordinates, wherein the selection is either a walking geographic distance or a driving geographic distance;

transmitting, to the electronic device of the consumer, store data of stores having the item in the group shopping list within a radius of a current location of the electronic device of the consumer and causing the electronic device to display at least a subset of the store data, wherein:
- in response to the selecting of the walking geographic distance, only transmitting store data for store locations within a first radius from the current location; and
- in response to the selecting of the driving geographic distance, only transmitting store data for store locations within a second radius from the current location, wherein the first radius is less than the second radius; and responsive to receiving GPS location data from the electronic device of the consumer indicating the consumer is in a store associated with the transmitted store data, transmitting in-store directions to the electronic device, wherein the in-store directions comprise a store map configured for display on the electronic device, along with item location indicia of a location of the item on the store map.

2. The method of claim 1, wherein a central server is configured to:
- monitor the location of the consumer relative to the store location; and
- responsive to determining that the location of the consumer relative to the store location is within a predetermined distance, send an alert to the electronic device associated with the consumer,
- wherein responsive to receipt of the alert, the electronic device associated with the consumer is configured to display the alert.

3. The method of claim 2, wherein the alert is displayed responsive to monitoring the location of the consumer relative to the store location.

4. The method of claim 3, wherein the alert is displayed in response to determining that a current location of the consumer is less than a predetermined distance from the store location.

5. The method of claim 2, wherein the alert is displayed in response to determining that a current location of the consumer is less than a predetermined distance from a predetermined home location of the consumer.

6. The method of claim 1, wherein the electronic device associated with the consumer is configured to:
- monitor the location of the consumer relative to the store location; and
- responsive to determining that the location of the consumer relative to the store location is within a predetermined distance, output an alert on a display of the electronic device associated with the consumer.

7. The method of claim 6, wherein the alert activates an application on the electronic device associated with the consumer to display the alert and to enable connection via a link to the group shopping list over the Internet.

8. The method of claim 6, wherein determining, based on the purchase window and previous purchases by the consumer, whether the consumer is scheduled to purchase the item comprises:
- accessing purchase history by the consumer of the item to determine a last time of purchase of the item;
- determining a frequency of purchase of the item;
- determining, based on the frequency of purchase of the item and the last time of purchase of the item, an estimated time for next purchase of the item;
- determining whether the estimated time for next purchase of the item is within the purchase window; and
- in response to determining that the estimated time for next purchase of the item is within the purchase window, determining that the consumer is scheduled to purchase the item.

9. The method of claim 8, wherein including the item in a group shopping list associated with the plurality of consumers comprising the consumer comprises:
- determining that the item is included in a database of consumer promotions and that a promotion associated with the item meets at least predetermined criteria;
- determining that at least one of the consumers of the plurality of consumers is scheduled to purchase the item; and
- in response to determining that the promotion associated with the item meets at least predetermined criteria and that at least one of the consumers of the plurality of consumers is scheduled to purchase the item, including the item in the group shopping list.

10. The method of claim 9, wherein the database of consumer promotions comprises an online promotion associated with the item; and
wherein the alert further comprises an indication of the online promotion associated with the item.

11. The method of claim 10, wherein the indication of the online promotion associated with the item comprises one of a link to a web address for downloading a webpage for the online promotion associated with the item or a barcode indicative of the online promotion associated with the item.

12. The method of claim 1, wherein the purchase window is a predetermined time range that is periodic in nature.

13. The method of claim 1, wherein the purchase window is determined based on the previous purchases by the consumer.

14. The method of claim 13, wherein the purchase window is determined by:
- determining, based on the previous purchases, a frequency of purchase of the item; and
- determining, based on the frequency of purchase, the purchase window.

15. The method of claim 1, wherein the specific life event comprises at least one of a birth, a marriage, a divorce, a death, a vacation, a graduation, or a military deployment.

16. A system configured to determine whether to include an item in a group shopping list, the system comprising:
- a communication interface configured to communicate with an electronic device associated with a consumer;
- a memory configured to store a consumer profile for the consumer; and
- a processor in communication with the communication interface and the memory, and configured to:
  - access the consumer profile for a consumer;
  - determine an item for purchase by the consumer based on a specific life event associated with the consumer;
  - access from the consumer profile a purchase window associated with purchasing the item;
  - determine, based on the purchase window and previous purchases by the consumer, whether the consumer is scheduled to purchase the item;
  - in response to determining that the consumer is scheduled to purchase the item, include the item in a group shopping list associated with a plurality of consumers that comprises the consumer;
  - receive a sequence of global positioning system (GPS) coordinates from an electronic device associated with the consumer;

select a geographic distance based on the sequence of GPS coordinates, wherein the selection is either a walking geographic distance or a driving geographic distance;

transmit, to the electronic device of the consumer, store data of stores having the item in the group shopping list within a radius of a current location of the electronic device of the consumer, wherein:

in response to the selection of the walking geographic distance, only transmitting store data for store locations within a first radius from the current location; and in response to the selection of the driving geographic distance, transmit store data for store locations within a second radius from the current location, wherein the first radius is less than the second radius; and responsive to receiving GPS location data from the electronic device of the consumer indicating the consumer is in a store associated with the transmitted store data, transmit in-store directions to the electronic device, wherein the in-store directions comprise a store map configured for display on the electronic device, along with item location indicia of a location of the item on the store map.

17. The system of claim 16, wherein the purchase window is a predetermined time range that is periodic in nature.

18. The system of claim 16, wherein the purchase window is determined based on the previous purchases by the consumer.

19. The system of claim 18, wherein the processor is configured to determine the purchase window is determined by:

determining, based on the previous purchases, a frequency of purchase of the item; and determining, based on the frequency of purchase, the purchase window.

20. The system of claim 16, wherein the processor is configured to determine, based on the purchase window and previous purchases by the consumer, whether the consumer is scheduled to purchase the item by:

accessing purchase history by the consumer of the item to determine a last time of purchase of the item;

determining a frequency of purchase of the item;

determining, based on the frequency of purchase of the item and the last time of purchase of the item, an estimated time for next purchase of the item;

determining whether the estimated time for next purchase of the item is within the purchase window; and in response to determining that the estimated time for next purchase of the item is within the purchase window, determining that the consumer is scheduled to purchase the item.

21. The system of claim 16, wherein the specific life event comprises at least one of a birth, a marriage, a divorce, a death, a vacation, a graduation, or a military deployment.

22. A system configured to determine whether to include an item in a group shopping list, the system comprising:

a communication interface configured to communicate with a smartphone associated with a consumer;

a memory configured to store a consumer profile for the consumer; and a processor in communication with the communication interface and the memory, and configured to:

determine an item for purchase based on a specific life event associated with the consumer, and a purchase window for the item, for the consumer based on the consumer profile;

add the item to a group shopping list associated with a plurality of consumers that comprise the consumer responsive to determining that the consumer is scheduled to purchase the item based on the purchase window;

receive a sequence of global positioning system (GPS) coordinates from an electronic device associated with the consumer;

select a geographic distance based on the sequence of GPS coordinates, wherein the selection is either a walking geographic distance or a driving geographic distance;

transmit, to the electronic device of the consumer, store data of stores having the item in the group shopping list within a radius of a current location of the electronic device of the consumer, wherein the processor is configured to:

in response to the selection of the walking geographic distance, only transmitting store data for store locations within a first radius from the current location; and in response to the selection of the driving geographic distance, only transmit store data for store locations within a second radius from the current location, wherein the first radius is less than the second radius; and cause at least a subset of the store data to appear on a display of the electronic device as an overlay on a real-time image from a digital camera of the electronic device.

23. The system of claim 22, wherein the specific life event comprises at least one of a birth, a marriage, a divorce, a death, a vacation, a graduation, or a military deployment.

\* \* \* \* \*